(12) United States Patent
Chuah et al.

(10) Patent No.: US 7,689,433 B2
(45) Date of Patent: Mar. 30, 2010

(54) ACTIVE RELATIONSHIP MANAGEMENT

(75) Inventors: Mei Chuah, San Leandro, CA (US); Dana Le, San Francisco, CA (US)

(73) Assignee: Accenture Global Services GmbH (CH)

( * ) Notice: Subject to any disclaimer, the term of this patent is extended or adjusted under 35 U.S.C. 154(b) by 1251 days.

(21) Appl. No.: 11/069,756

(22) Filed: Feb. 28, 2005

(65) Prior Publication Data

US 2006/0036461 A1 Feb. 16, 2006

Related U.S. Application Data

(60) Provisional application No. 60/601,275, filed on Aug. 13, 2004.

(51) Int. Cl.
*G06F 9/46* (2006.01)
(52) U.S. Cl. ........................................................ 705/1
(58) Field of Classification Search ........................ 705/1
See application file for complete search history.

(56) References Cited

U.S. PATENT DOCUMENTS

| | | | |
|---|---|---|---|
| 5,778,404 A * | 7/1998 | Capps et al. | 715/234 |
| 6,078,924 A | 6/2000 | Ainsbury et al. | |
| 6,151,584 A | 11/2000 | Papierniak et al. | |
| 6,571,240 B1 | 5/2003 | Ho et al. | |
| 6,850,896 B1 * | 2/2005 | Kelman et al. | 705/10 |
| 7,136,880 B2 * | 11/2006 | Wilkins et al. | 707/203 |
| 2004/0117241 A1 * | 6/2004 | Krasikov et al. | 705/11 |
| 2005/0021391 A1 * | 1/2005 | Lu et al. | 705/11 |
| 2006/0111960 A1 * | 5/2006 | Chess et al. | 705/10 |

FOREIGN PATENT DOCUMENTS

EP 1233349 8/2002

OTHER PUBLICATIONS

"Mining Product Reputations on the Web", Sotaoshi Morinaga et al., 2002, p. 341-349, http://portal.acm.org/citation.cfm?id=775047.775098.*
"Article Request: Business Value Modelling", Philip K. M'Pherson, 1998, p. 154-172, http://www.emeraldinsight.com/Insight/viewContentItem.do;jsessionid=11A377179666B672CC99DA719CCE7912?contentType=Article&contentId=1705995.*
"Mapping knowledge domains: Characterizing PNAS" Kevin W. Boyack, 2004, 5192-5199, http://www.pnas.org/content/101/suppl.1/5192.full.*

(Continued)

*Primary Examiner*—Neveen Abel Jalil
*Assistant Examiner*—Kellye D Buckingham
(74) *Attorney, Agent, or Firm*—Fish & Richardson P.C.

(57) ABSTRACT

Methods and apparatus for active relationship management. A computer implemented method for relationship management includes receiving a list of one or more enterprises. The method includes identifying one or more individuals associated with at least one of the enterprises. The method includes receiving information related to a topic of interest. The method includes parsing the received topic information into units of data. The method includes searching the units of data for one or more quotes. The method includes determining whether a found quote is related to any of the identified individuals. The method includes associating, if the found quote is determined to be related to one or more of the identified individuals, the quote found with the one or more individuals. The method includes storing the quote in a database.

21 Claims, 31 Drawing Sheets

OTHER PUBLICATIONS

"Information technology: What does it mean for scientist and scholars in the developing world", Subbiah Arunachalam, 1999, p, 21-24. http://findarticles.com/p/articles/mi_qa3633/is_199904/ai_n8833442/.*

"Growth at Top of Disty Concerns", Rob Spiegel, 2002, http://findarticles.com/p/articles/mi_m0EKF/is_29_48/ai_89232243/.*

Endlink database combo helps out researcher, Shanker Gess, 1995, 116 pages, Published by InfoWorld Media Group, Inc., http://books.google.com/books?id=2ToEAAAAMBAJ&dq=End+Link+database+combo+helps+out+researcher+Shanker+Gess&source=gbs_all_issues_r&cad=2.*

"Strategies for U.S. competiveness: A survey for business leaders", Y. K. Shetty, Business Horizon, 1991, http://findarticles.com/p/articles/mi_m1038/is_n6_v34/ai_11610785/.*

Feldman, et al. "Knowledge Management: A Text Mining Approach", Proceedings of the $2^{nd}$ International Conference on Practical Aspects of Knowledge Management (PAKM98), Basel, Switzerland, Oct. 29-30, 1998, 10 pages.

Rau, et al. "Creating Segmented Databases from Free Text for Text Retrieval", Proceedings of the Fourteenth Annual International ACM/SIGIR Conference on Research and Development in Information Retrieval, Chicago, Illinois, Oct. 13-16, 1991, pp. 337-346.

Sullivan, "Document Warehousing and Text Mining: Chapters 6 and 8", Document Warehousing and Text Mining, Wiley Computer Publishing, 2001, pp. 123-158 and 183-208.

* cited by examiner

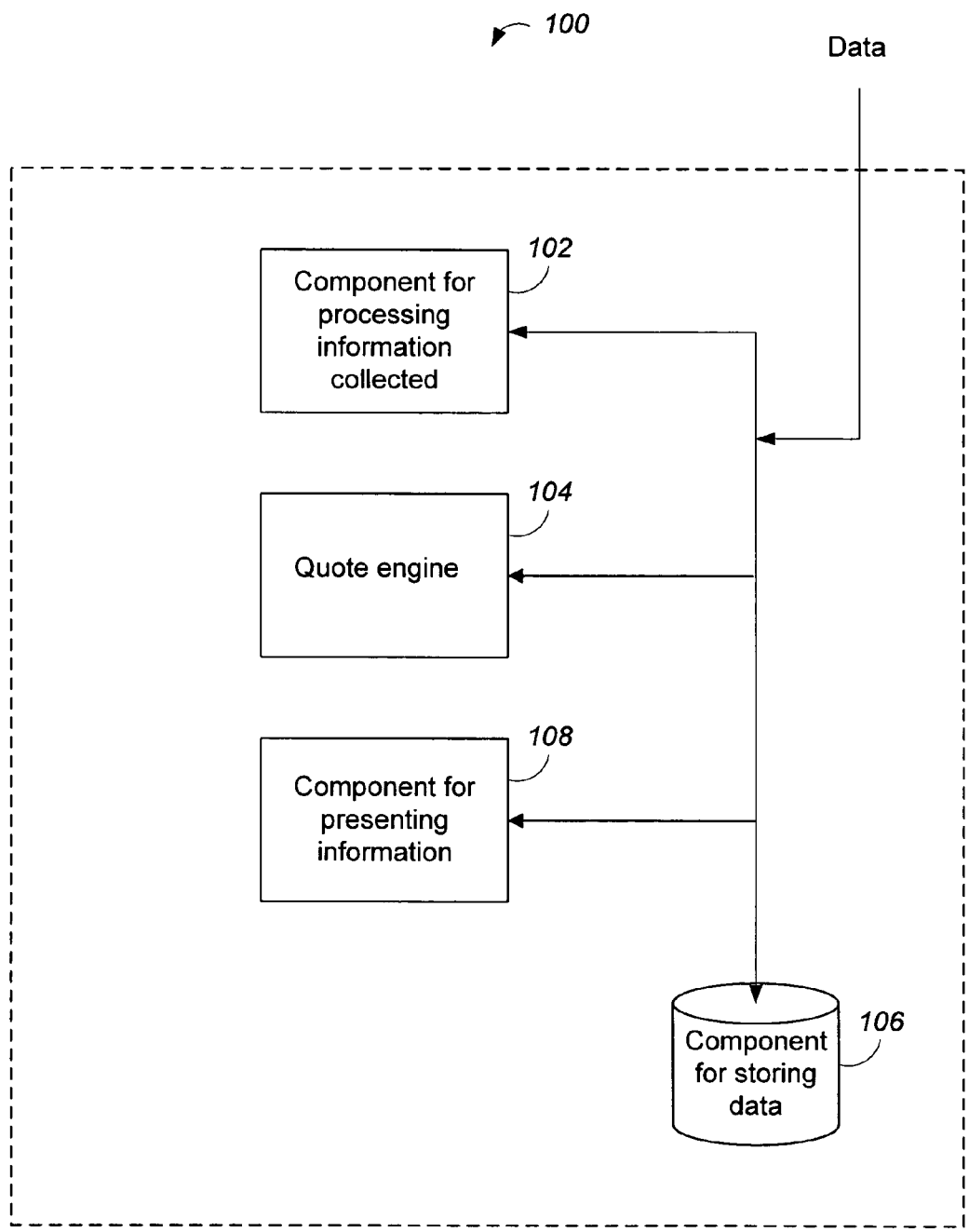
FIG._1

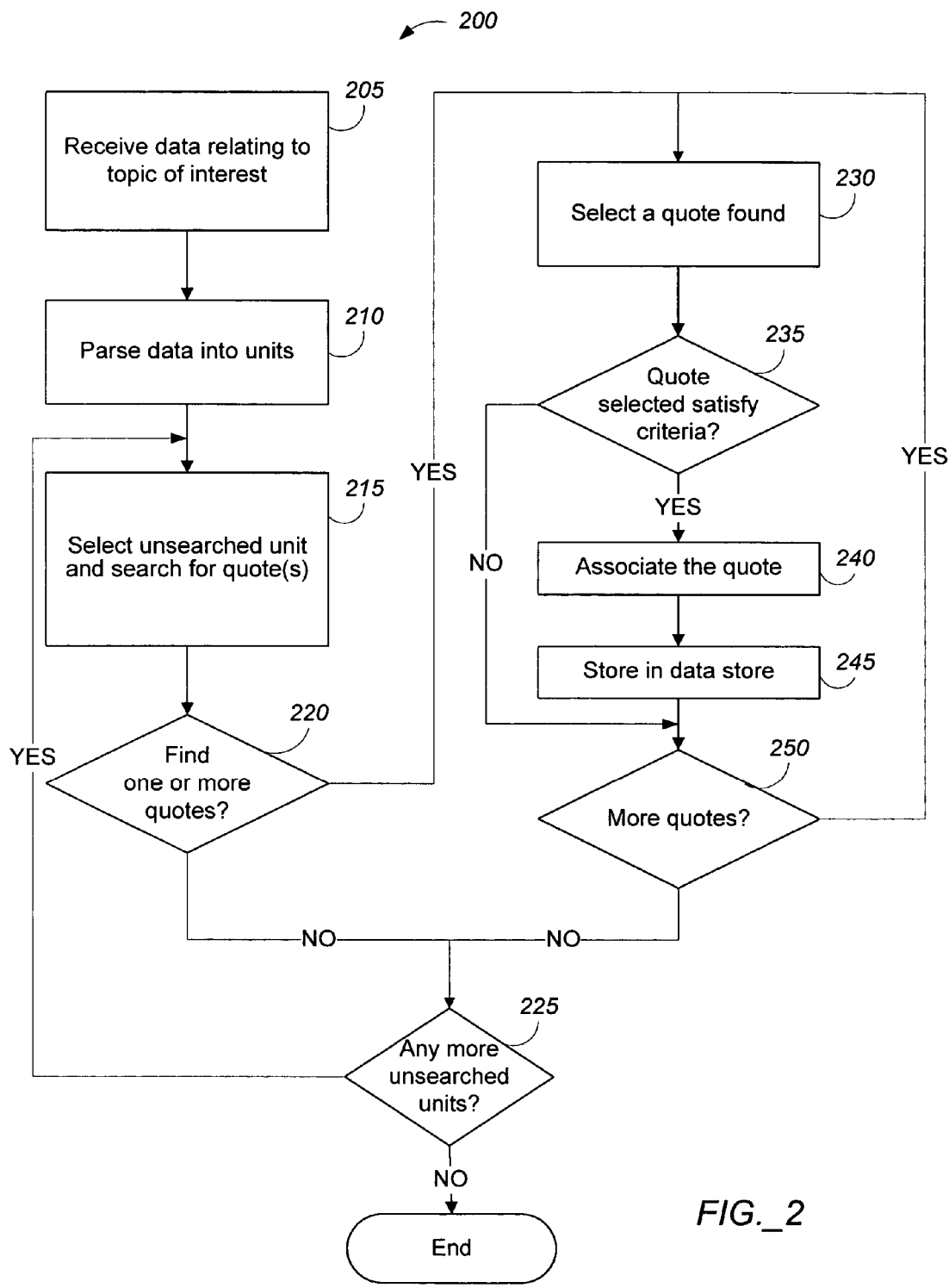
FIG._2

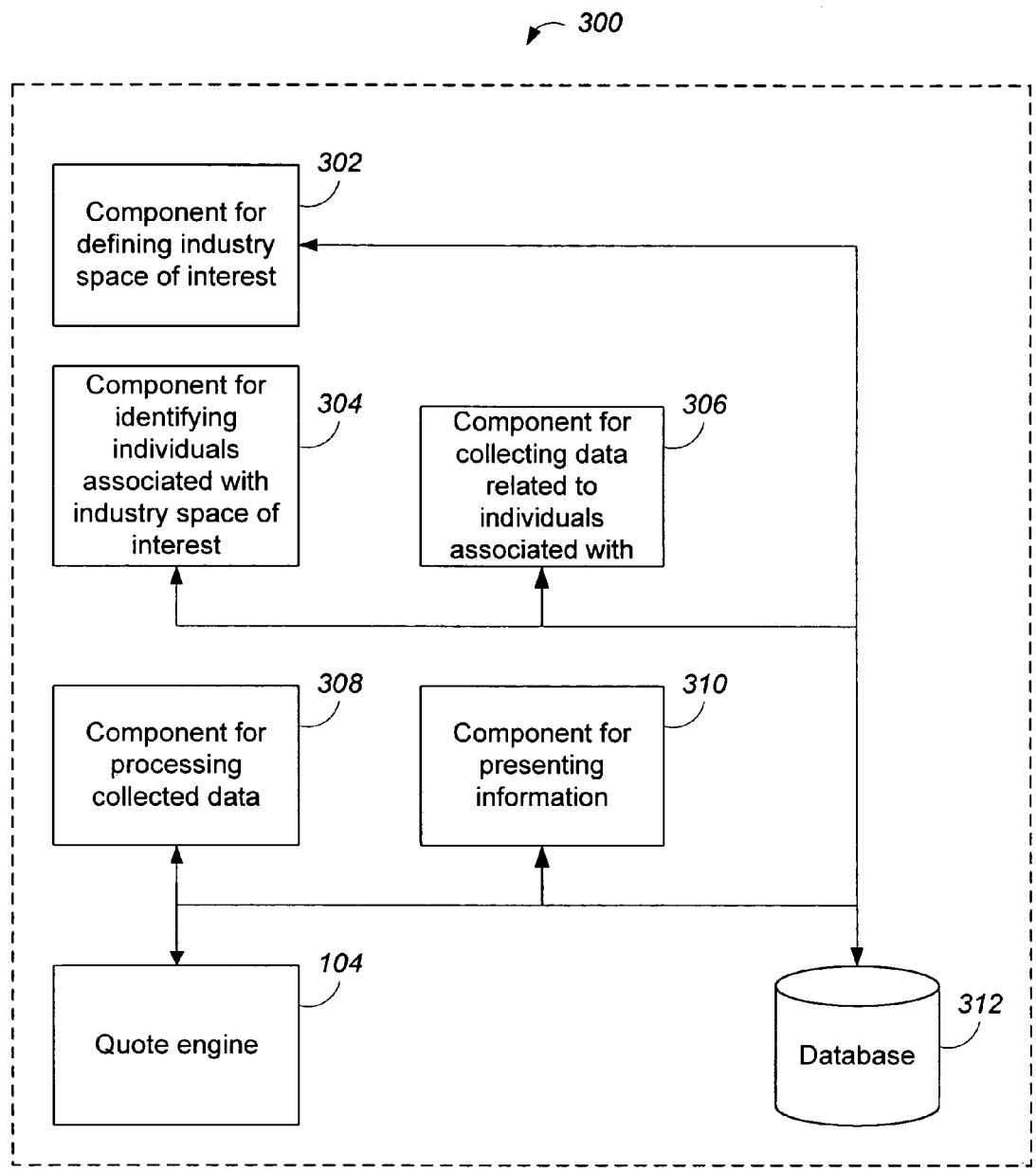
FIG._3

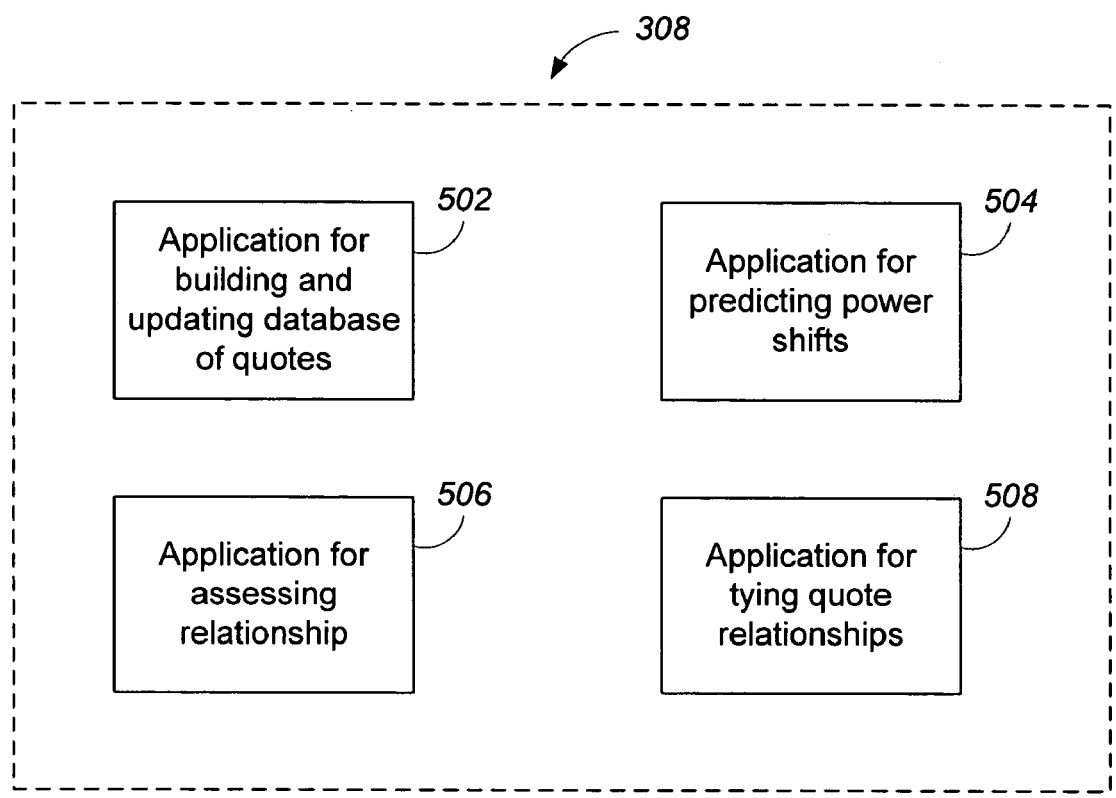
FIG._5

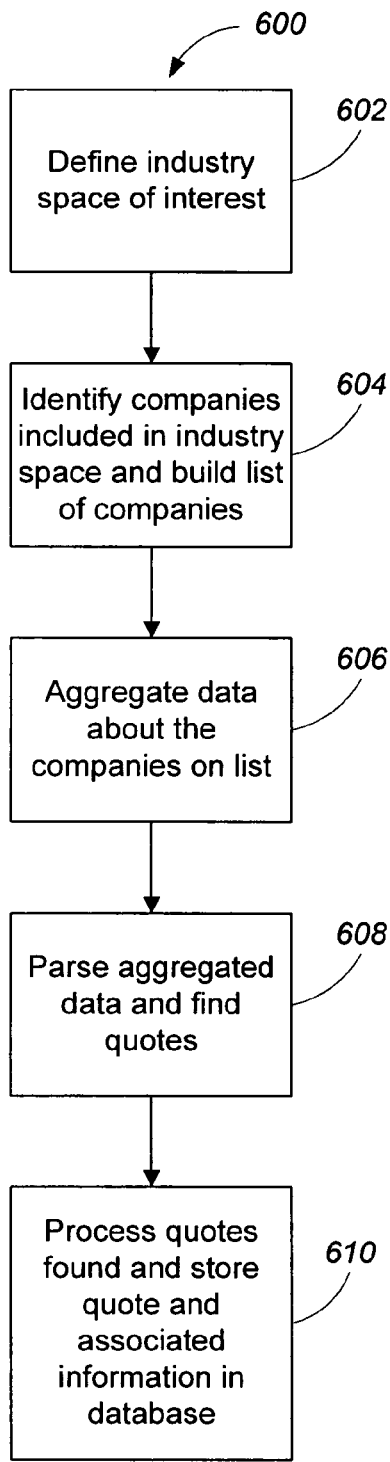
FIG._6
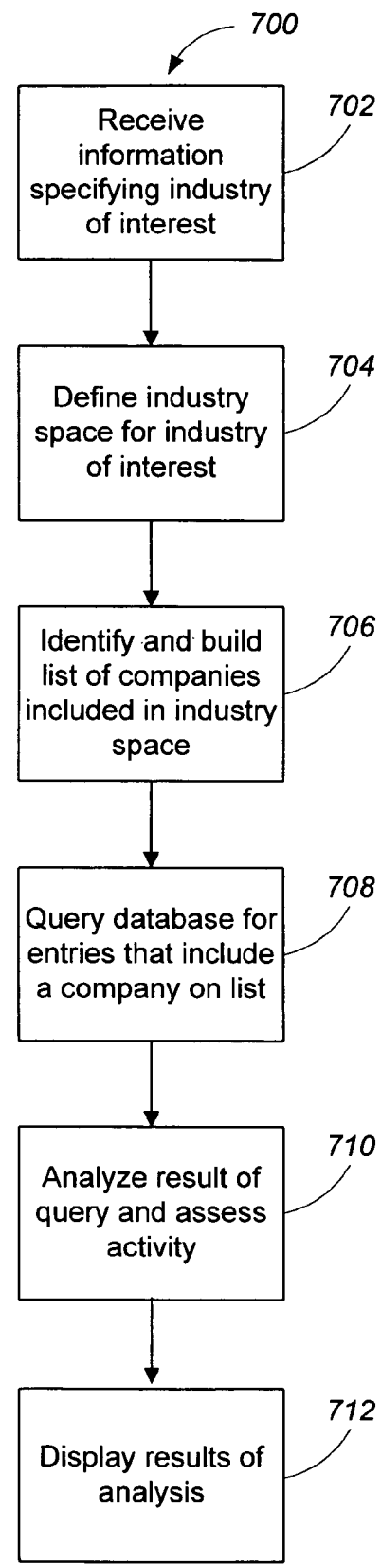
FIG._7

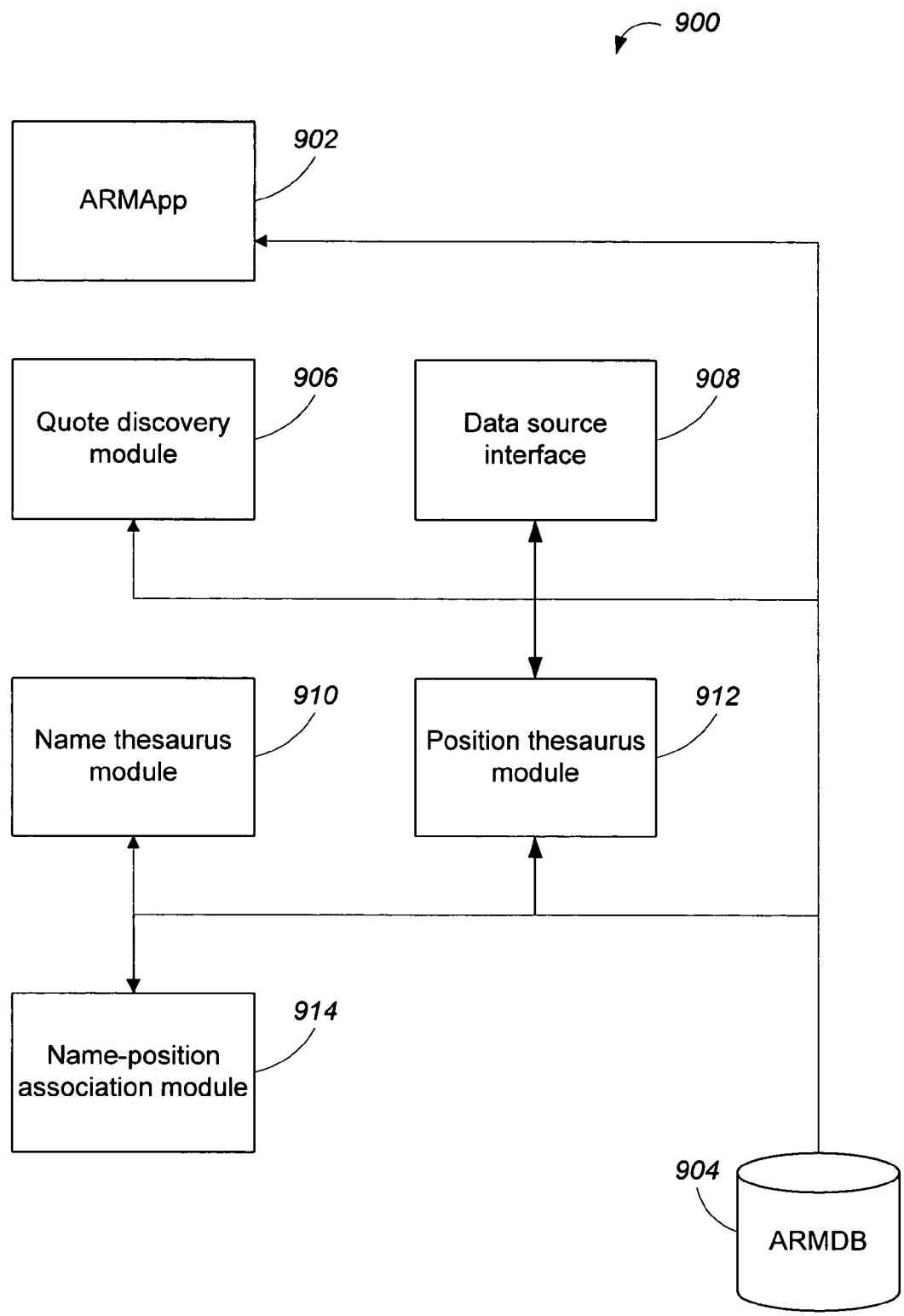
FIG._9

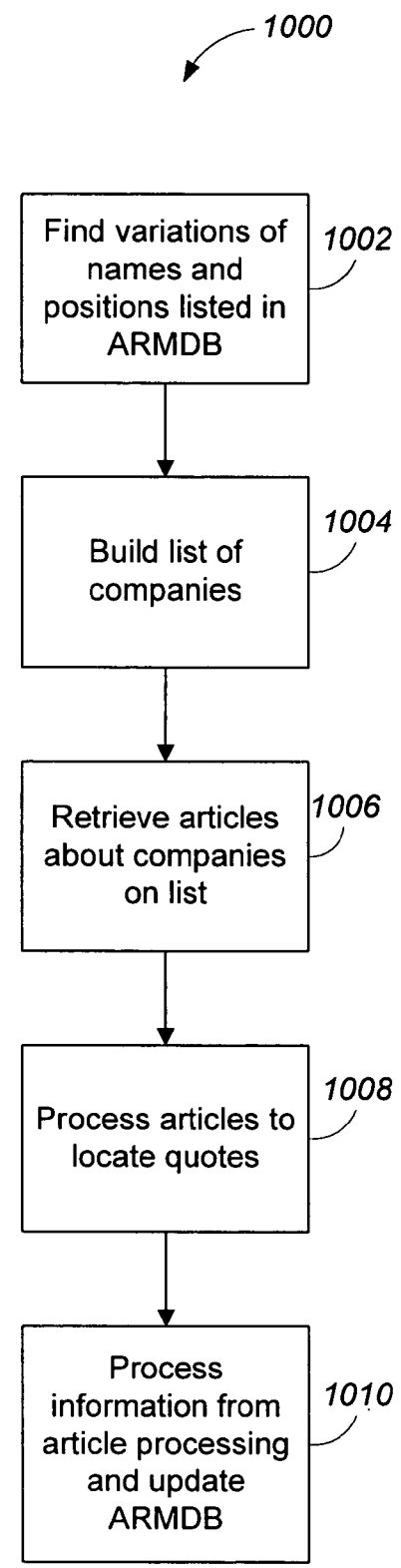
FIG._10

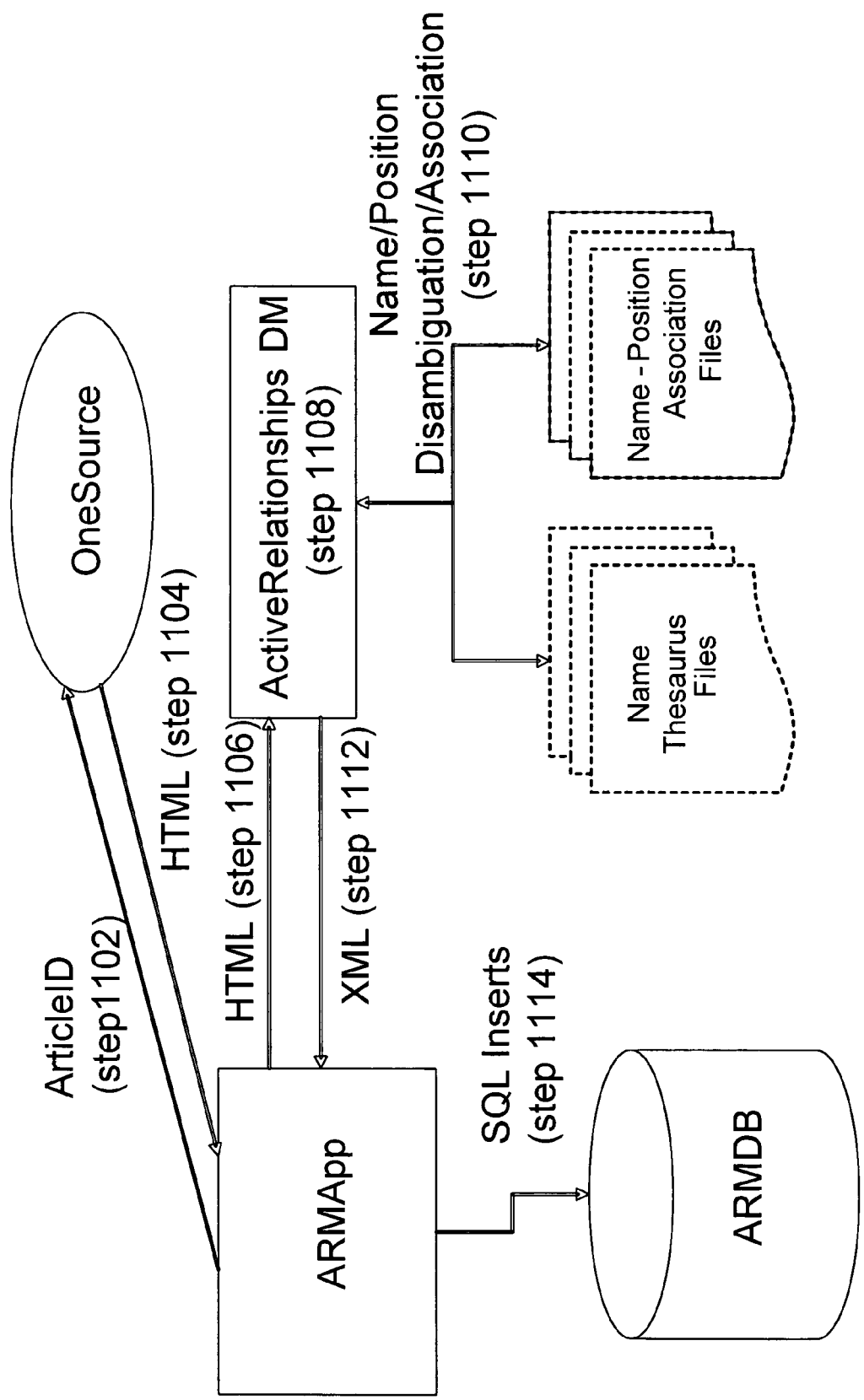
FIG_11

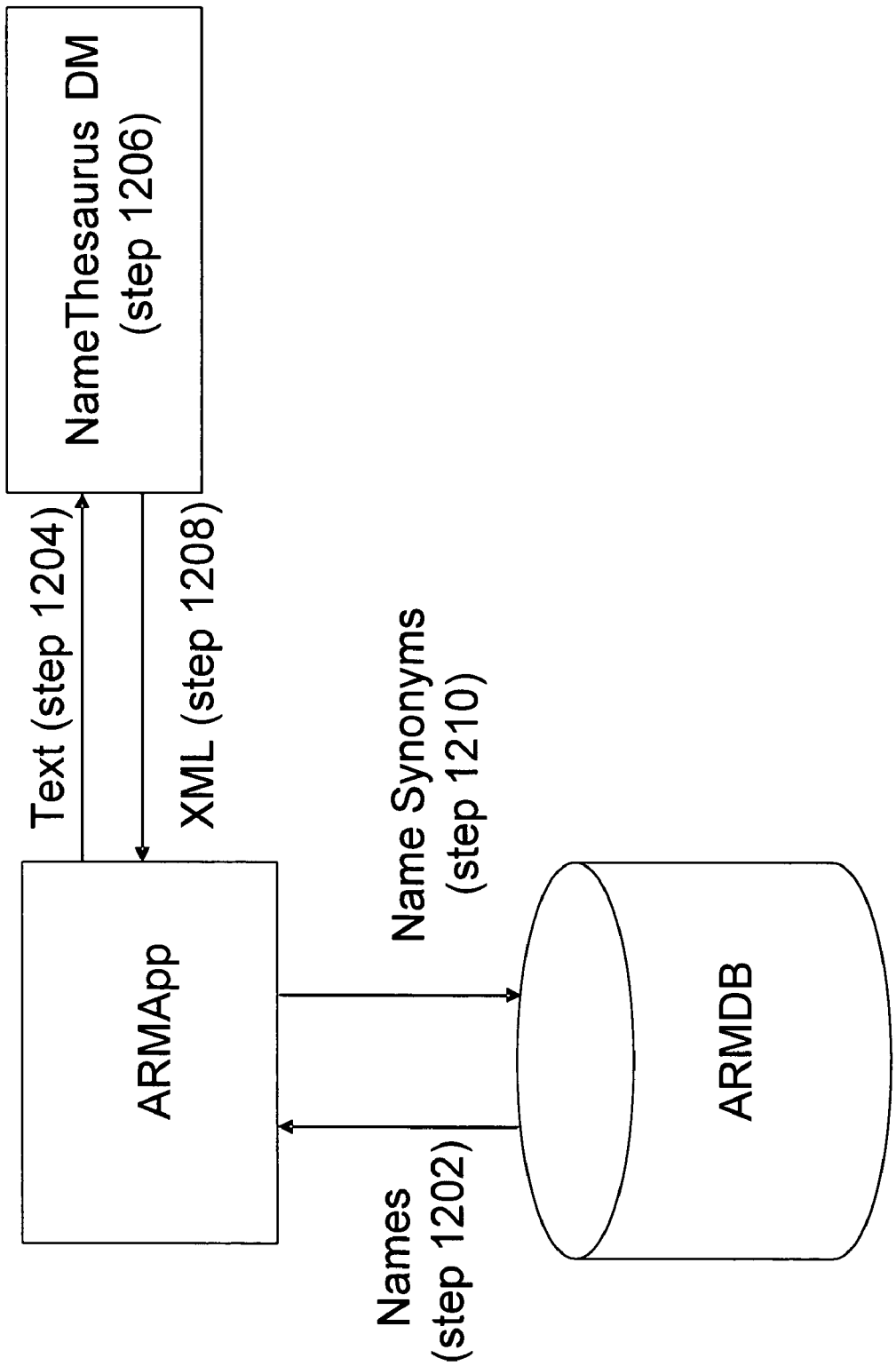
FIG._12

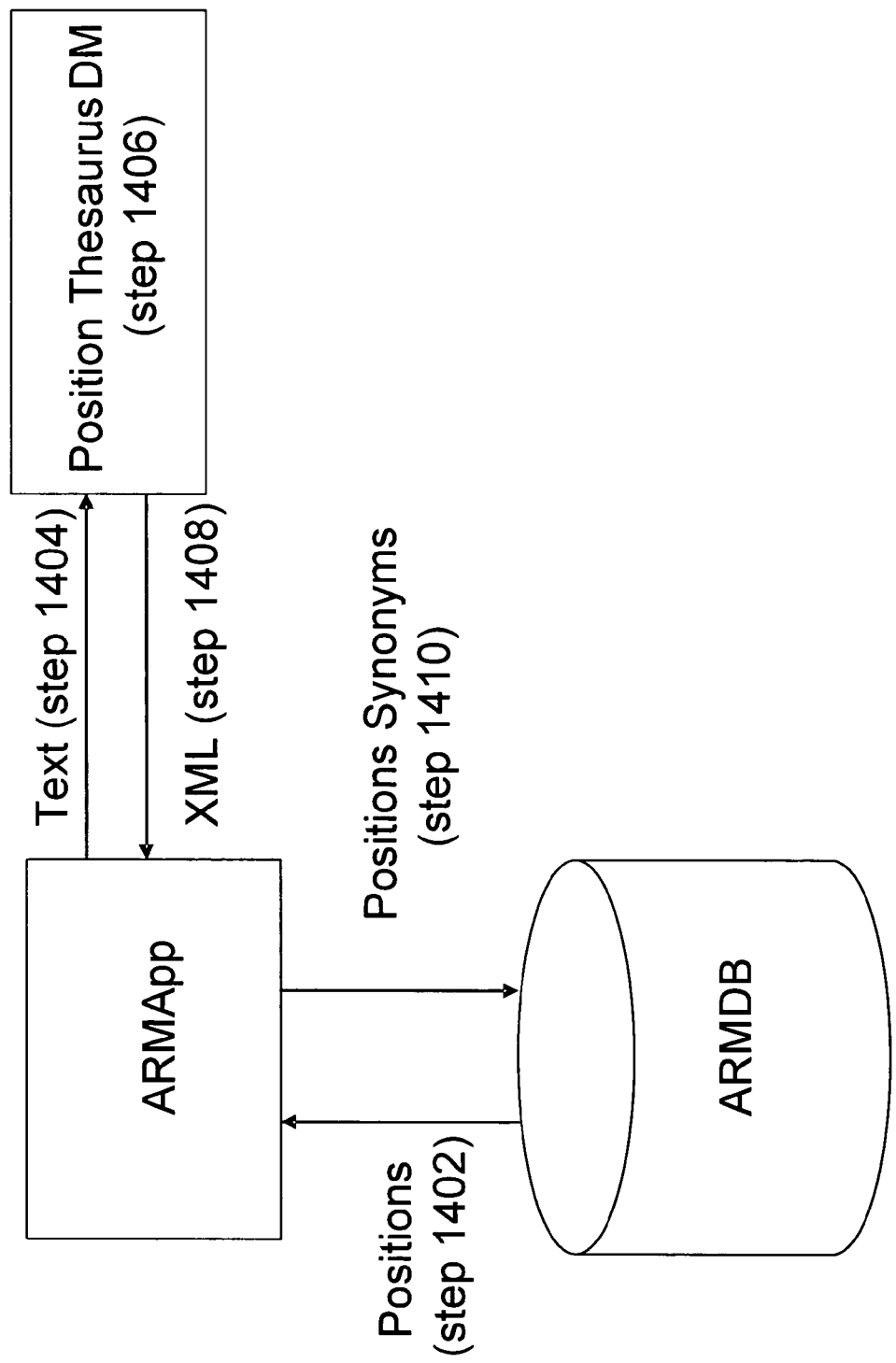
FIG._14

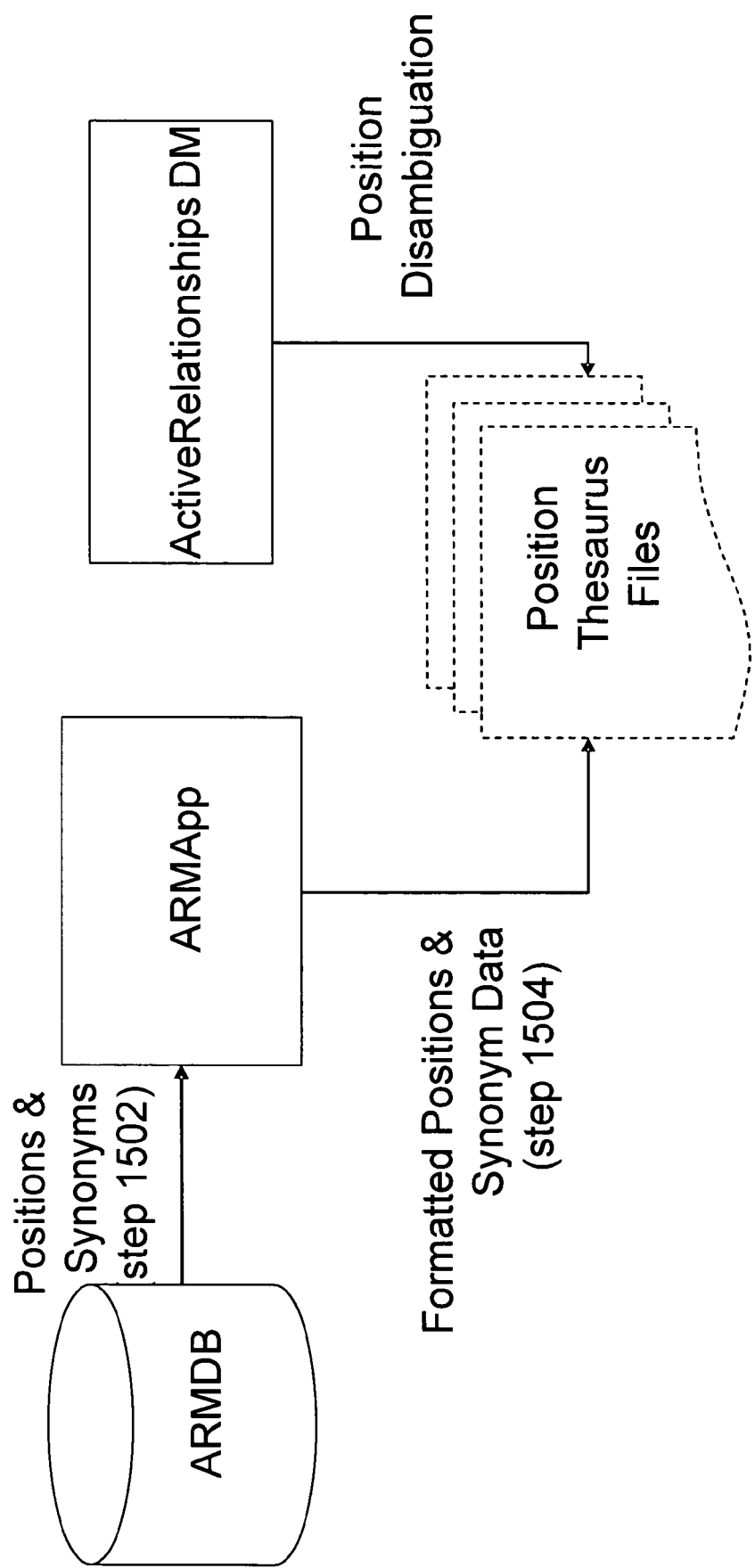
FIG._15

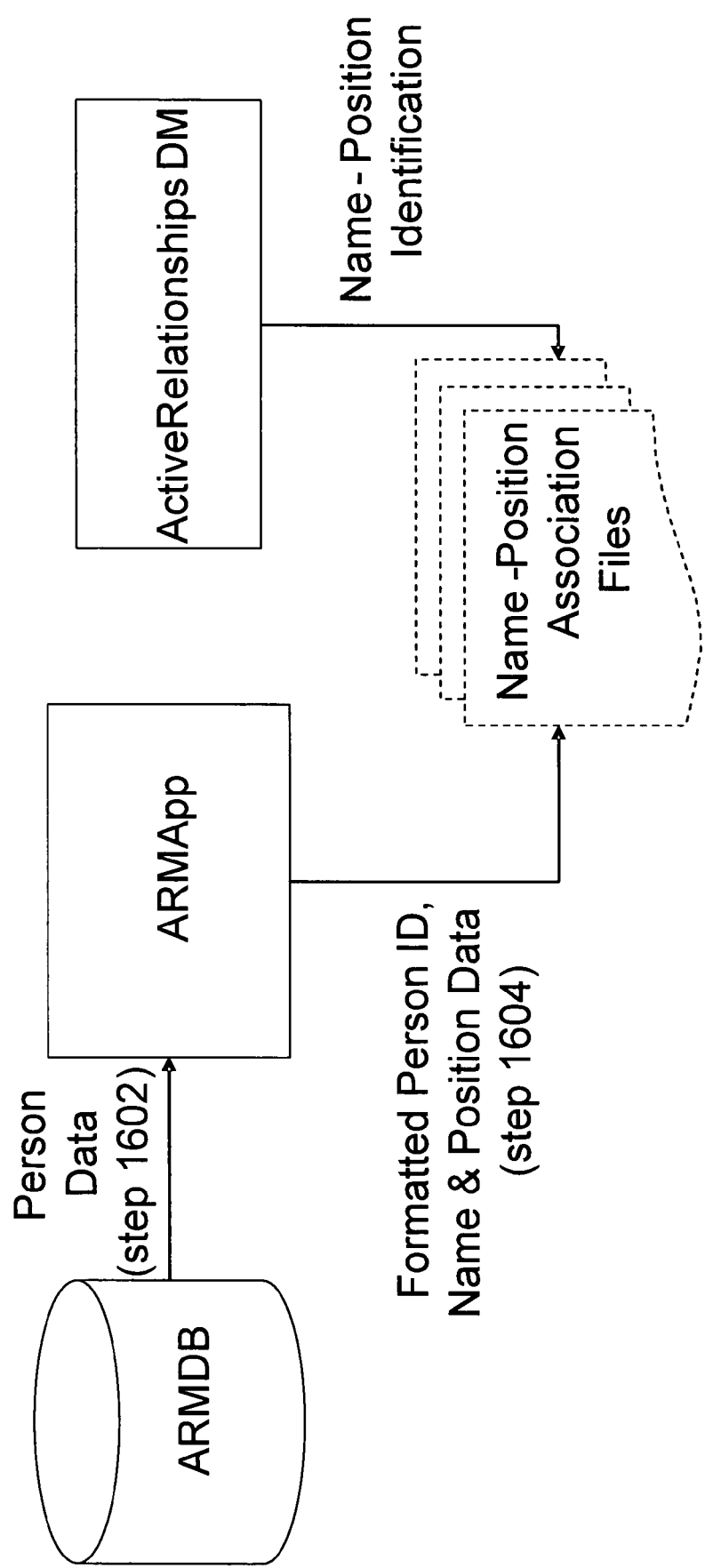
FIG._16

FIG. 17A

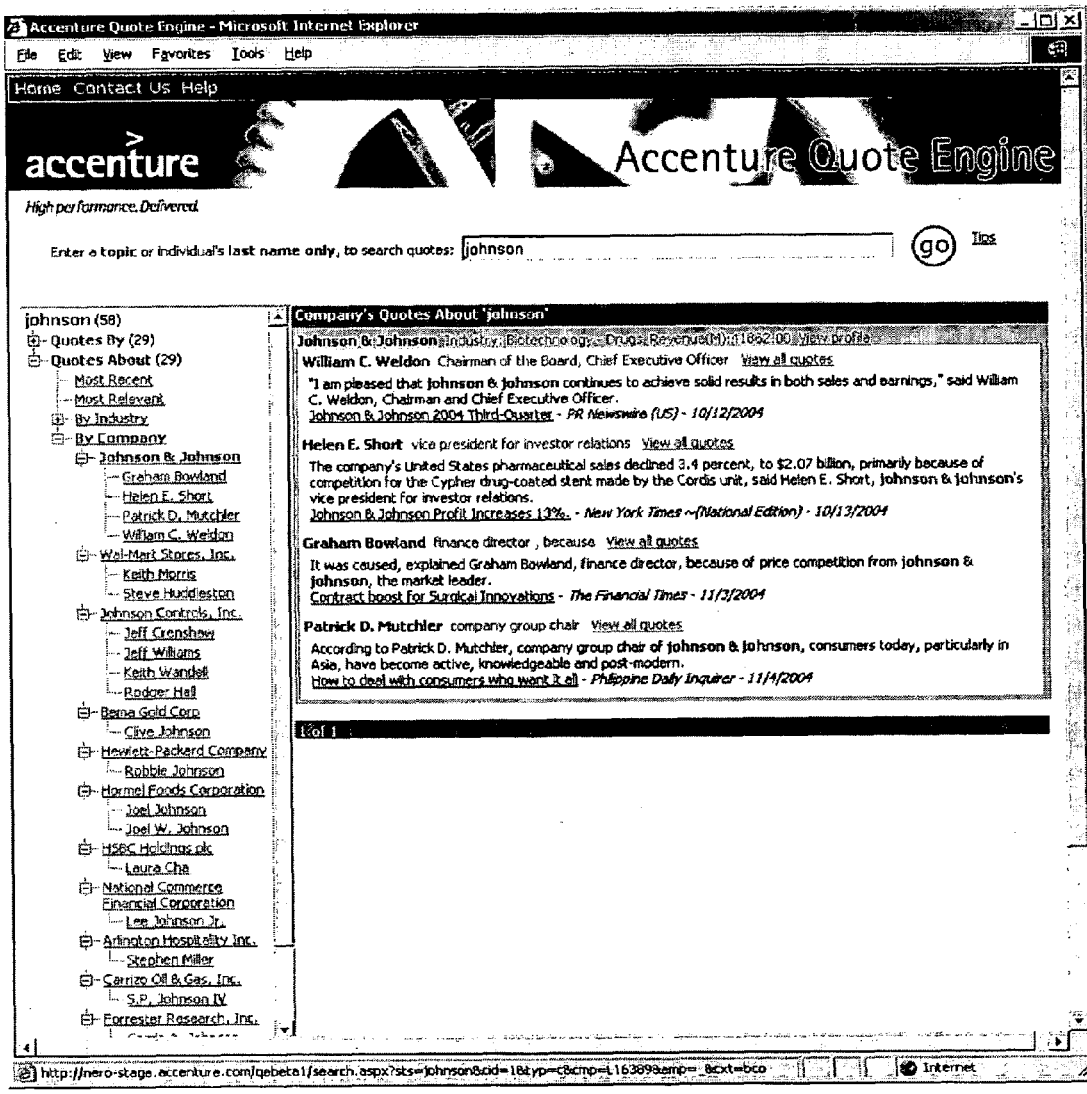
FIG._17B

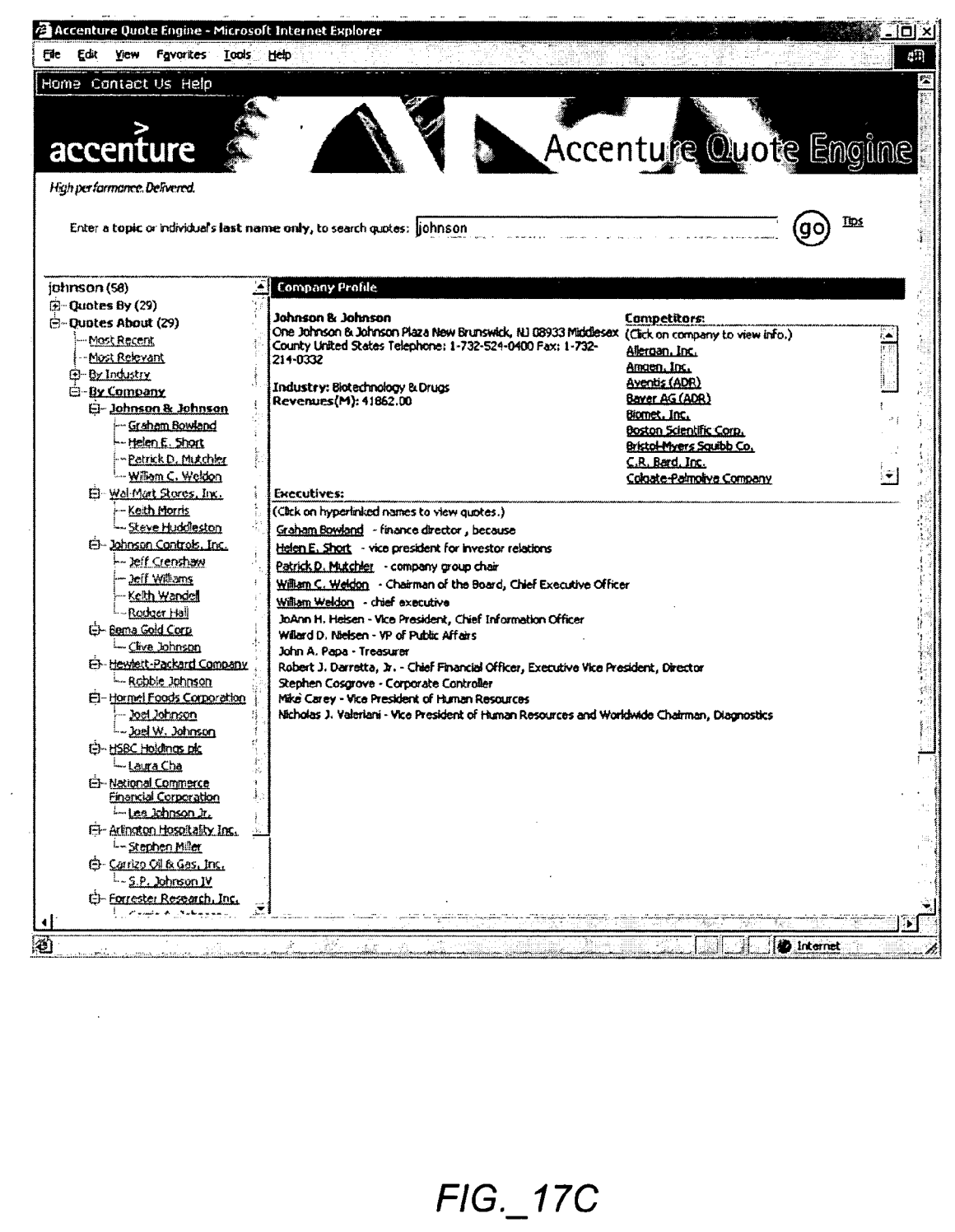

FIG._17C

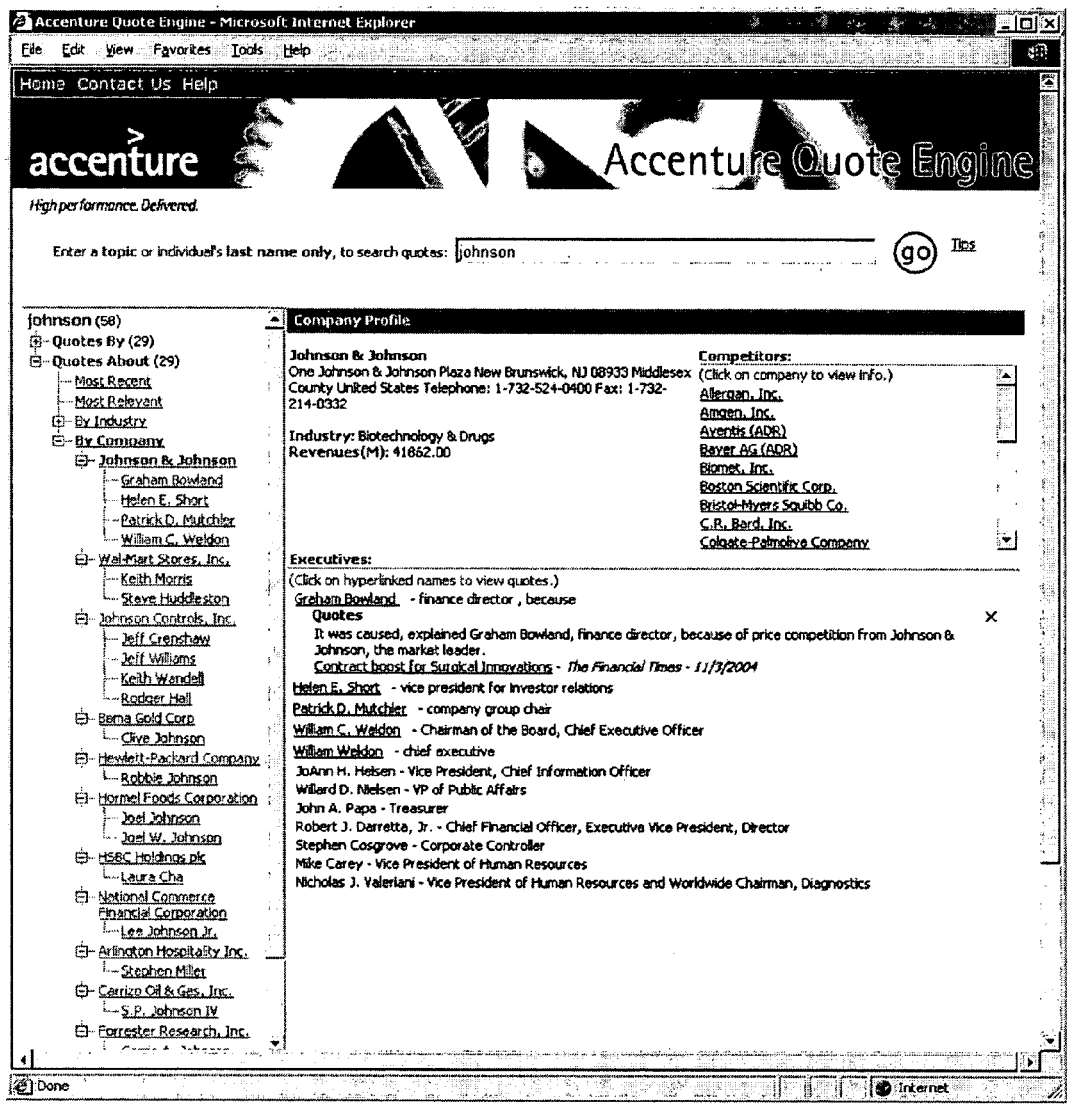
FIG._17D

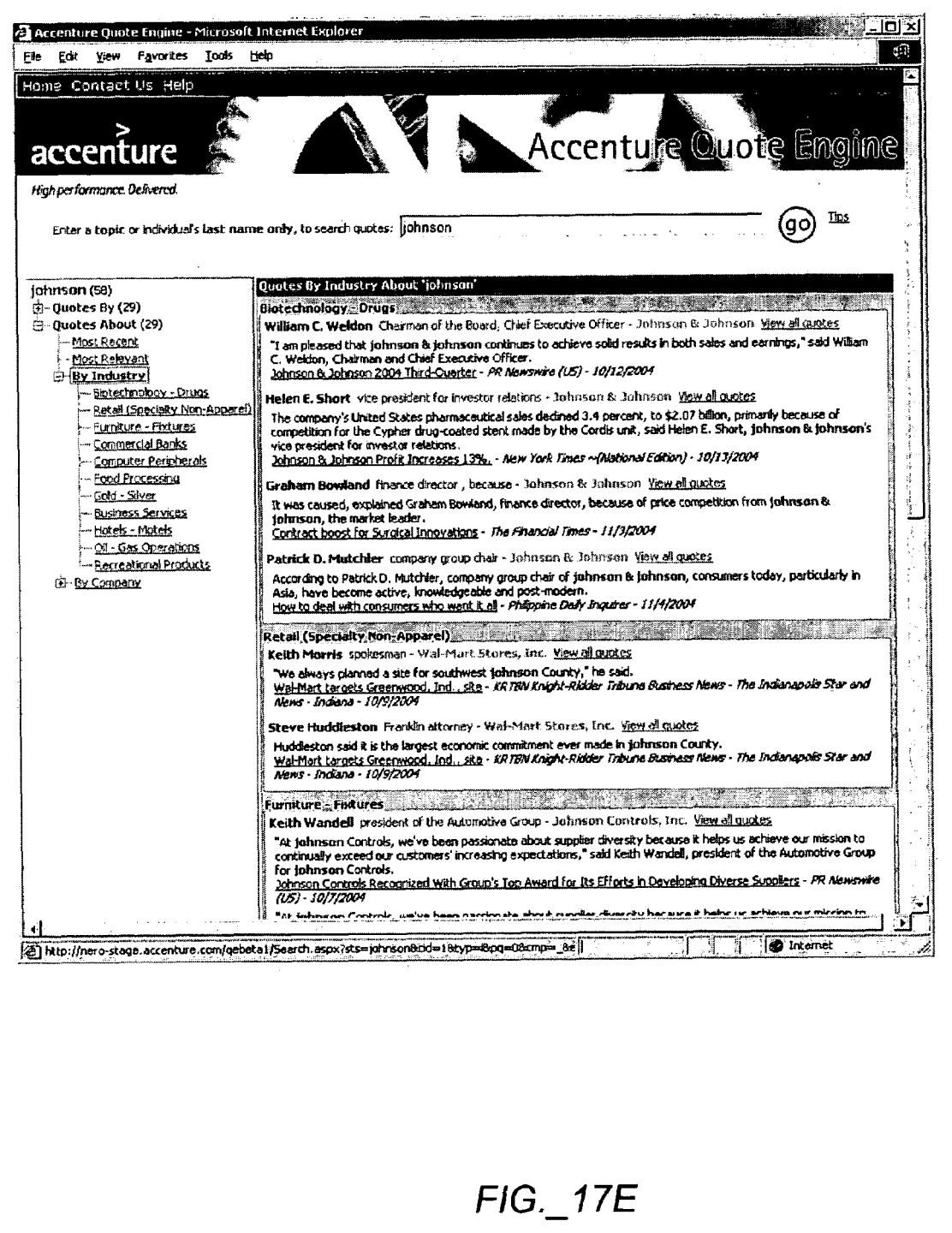

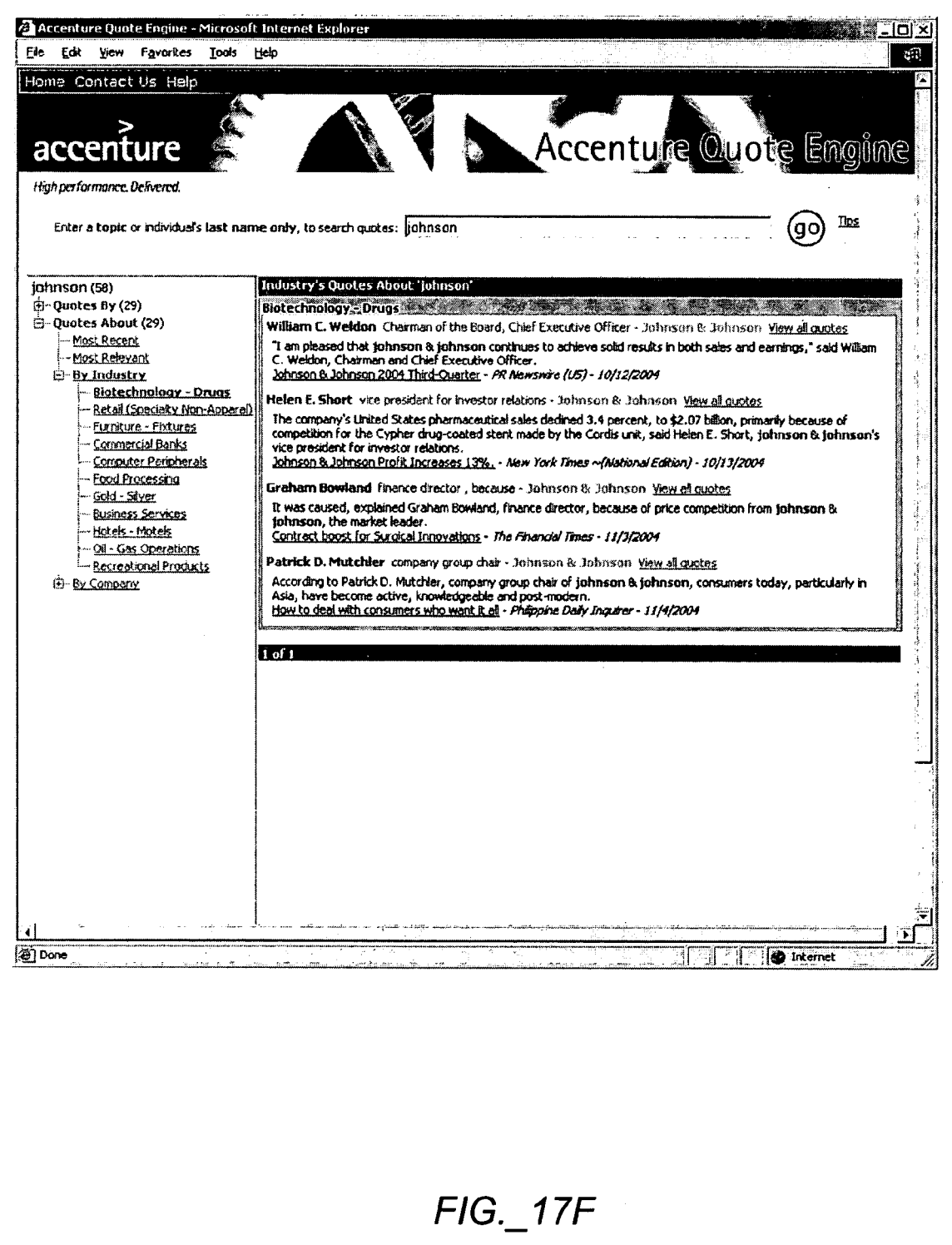

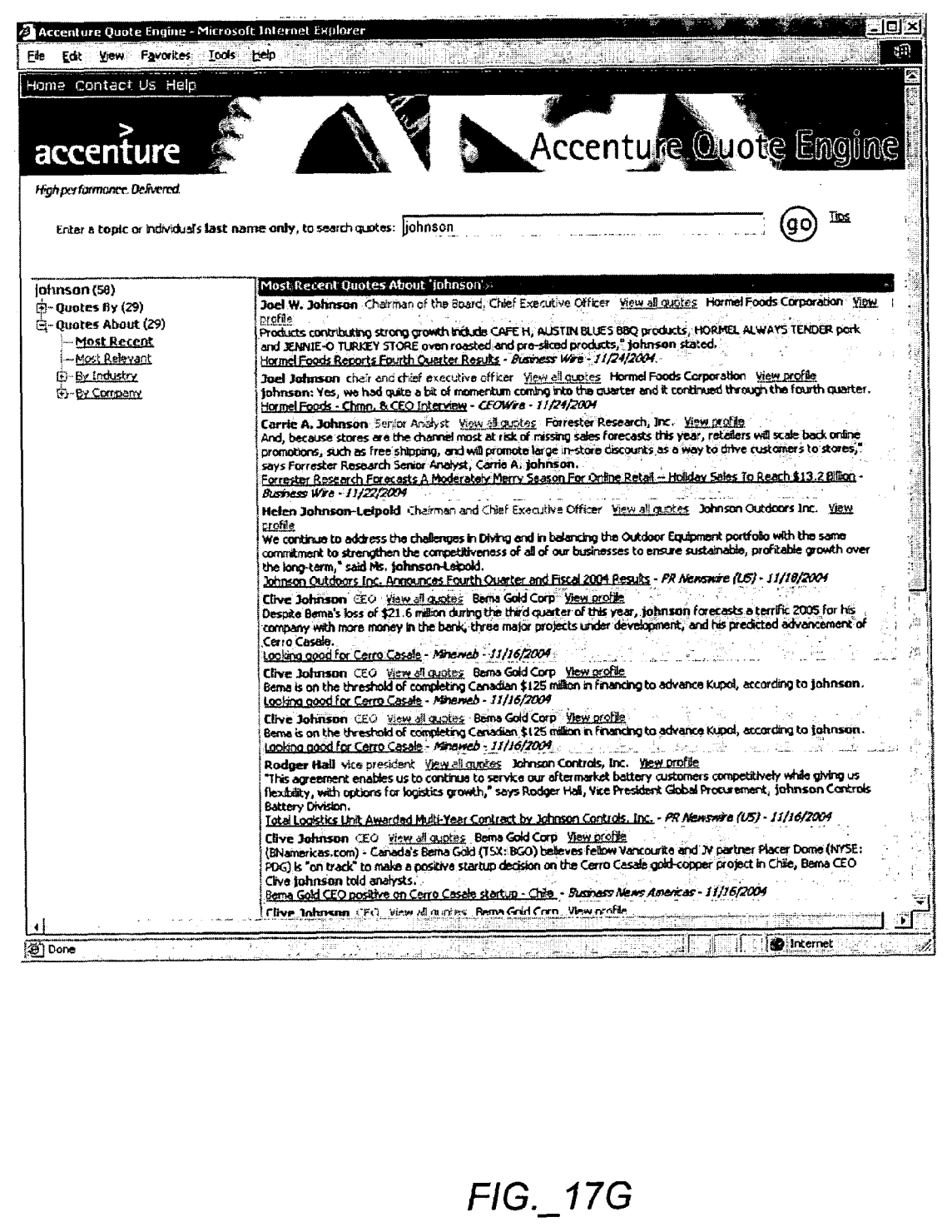

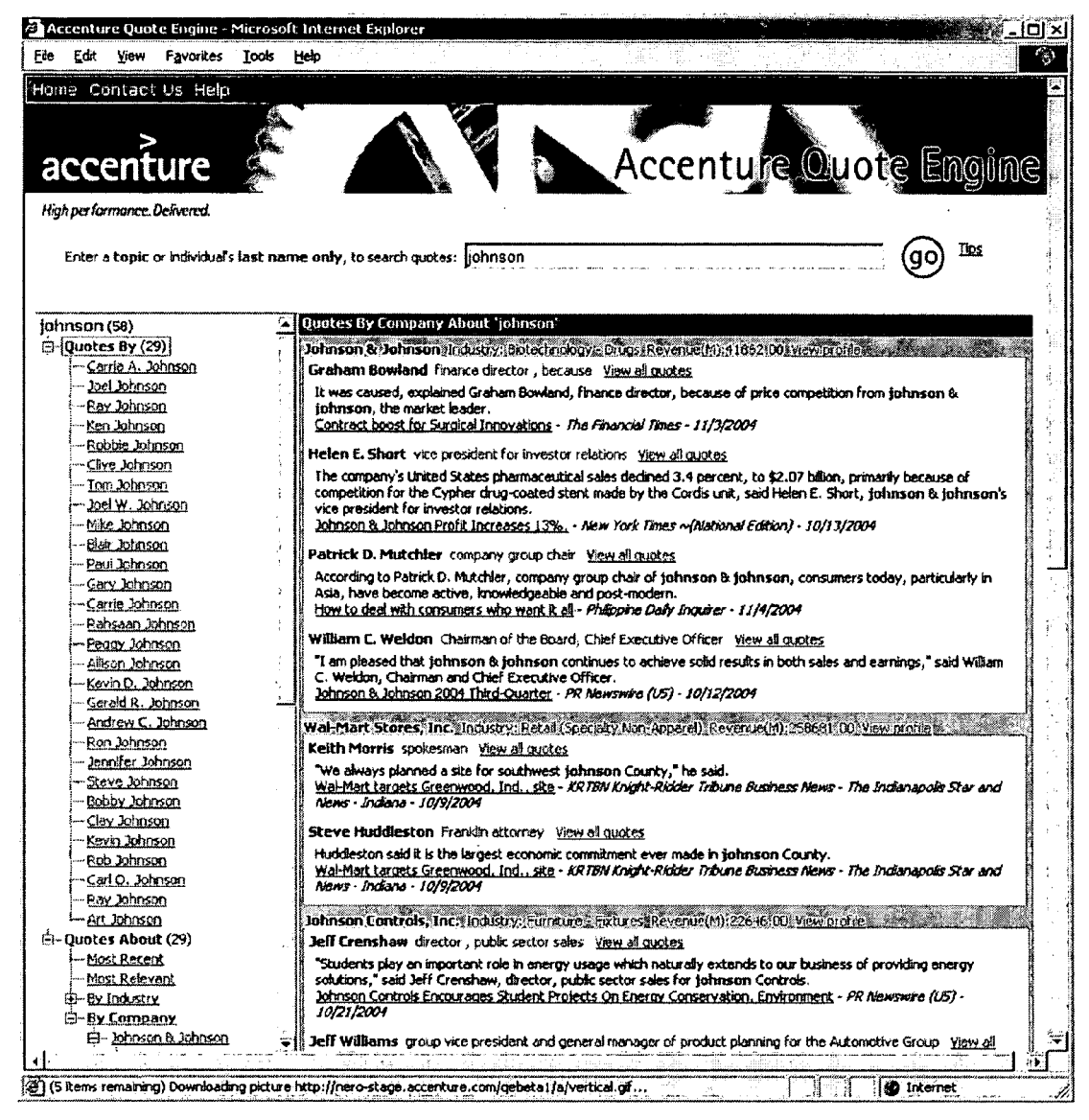

ACTIVE RELATIONSHIP MANAGEMENT

CROSS-REFERENCE TO RELATED APPLICATIONS

This application claims priority to U.S. Provisional Application Ser. No. 60/601,275, filed on Aug. 13, 2004. The disclosure of the prior application is considered part of and is incorporated by reference in the disclosure of this application.

BACKGROUND

The present specification relates to data processing, for example, such as used in the context of relationship management.

Tools for relationship management can include one or more business applications that operate in conjunction with database systems and databases. In general, conventional relationship management tools track information about a company of interest and perform analyses that are based on perceivable trends in the information. Information about a company includes, by way of example, business transactions or operations effected by the company, financial information about the company, and performance evaluation of the company. Relationship management tools implementing this scheme can provide an organization-level perspective for companies of interest.

Relationship management tools have various business applications, including, for example, sales—the life blood of most companies. Company revenues are directly tied to establishing and maintaining strong relationships with their gold or most valuable customers. Gold customers buy more, buy more often, and are more loyal than the average customer. One relationship management tool typically used to establish and maintain strong relationship with customers is a customer relationship management ("CRM") system. As with other conventional relationship management tools, a conventional CRM system focuses on organization-level information.

SUMMARY

The present specification discusses methods and apparatus, including a computer-program product, for active relationship management based on, for example, quotes in publications of interests. The quotes typically are derived from individuals associated with companies of interests.

In one general aspect, the present specification discloses a computer-implemented method for relationship management. The method includes receiving a list of one or more enterprises. The method includes identifying one or more individuals associated with at least one of the enterprises. The method includes receiving information related to a topic of interest. The method includes parsing the received topic information into units of data. The method includes searching the units of data for one or more quotes. The method includes determining whether a found quote is related to any of the identified individuals. The method includes associating, if the found quote is determined to be related to one or more of the identified individuals, the quote found with the one or more individuals. The method includes storing the quote in a database.

In another general aspect, the present specification discloses a computer program product for building a database of quotes. The product includes instructions operable to cause a processor to receive a list of one or more enterprises. The product includes instructions to identify one or more individuals associated with at least one of the enterprises. The product includes instructions to receive information related to a topic of interest. The product includes instructions to parse the received topic information into units of data. The product includes instructions to search the units of data for one or more quotes. The product includes instructions to determine whether a found quote is related to any of the identified individuals. The product includes instructions to associate, if the found quote is determined to be related to one or more of the identified individuals, the quote found with the one or more individuals. The product includes instructions to store the quote in a database. The product is tangibly stored on machine-readable medium.

In another general aspect, the present specification discloses a computer-implemented method for processing quotes. The method includes receiving a list of one or more organizations. The method includes retrieving, for an organization on the list, information about the organization. The method includes parsing the retrieved information into units and, for a unit of information, searching the unit for a combination of a first character string and a second character string. The first character string is any character string on a first list that includes character strings used to refer to a person. The first list includes character strings that are variations of a same proper name for a person. The second character string is any character string on a second list of character strings that includes character strings used to represent a quote. The method includes, upon finding the combination in a unit, extracting from the unit the first and second character strings of the combination and storing the extracted character strings as a database entry in a database of quotes. The first character string represents a person and the second character string represents a quote attributed to the person.

In another general aspect, the present specification discloses a computer program product for processing quotes. The product includes instructions operable to cause a processor to receive a list of one or more organizations. The product includes instructions to retrieve, for an organization on the list, information about the organization. The product includes instructions to parse the retrieved information into units and, for a unit of information, search the unit for a combination of a first character string and a second character string. The first character string is any character string on a first list that includes character strings used to refer to a person. The first list includes character strings that are variations of a same proper name for a person. The second character string is any character string on a second list of character strings that includes character strings used to represent a quote. The product includes instructions to extract, upon finding the combination in a unit, from the unit the first and second character strings of the combination and store the extracted character strings as a database entry in a database of quotes. The first character string represents a person and the second character string represents a quote attributed to the individual. The product is tangibly stored on machine-readable medium.

In another general aspect, the present specification discloses a system that includes a data aggregator operable to retrieve information about each organization on a list of one or more organizations. The system includes a parser operable to parse the retrieve information into units of information. The system includes a quote engine operable, for a unit of information, to search the unit for a combination of a first character string and a second character string. The first character string is any character string on a first list that includes character strings used to refer to a person. The first list includes character strings that are variations of a same proper name for a person. The second character string is any character string on a second list of character strings that includes character strings used to represent a quote. The quote engine is further operable, upon finding the combination in a unit, to extract from the unit the first and second character strings of the combination. The system includes a database in which the extracted character strings are stored as a database entry. The first character string represents a person and the second character string represents a quote attributed to the person.

Methods and apparatus described in the present application can be implemented to realize one or more of the following advantages. A system as described below is able to monitor, among other things, who is being quoted in publications of interests, the frequency at which the individual is quoted, and the subject of the quotes and, thus, can support the social side of sales in addition to the transactional or operational sides. The system can monitor information regarding individuals, in addition to or in lieu of organization-level information, and provide a person-to-person relationship based framework for business applications such as sales.

The details of one or more implementations are set forth in the accompanying drawings and the description below. Other features and advantages of the invention will become apparent from the description, the drawings, and the claims.

BRIEF DESCRIPTION OF THE DRAWINGS

FIG. 1 is shows a system 100 for active relationship management.

FIG. 2 shows a method for building a database of quotes.

FIG. 3 shows an implementation of a system for active relationship management.

FIG. 5 shows applications that can be included in the implementation.

FIG. 6 shows a method by which the implementation builds a database of quotes.

FIG. 7 shows a method for assessing activities of companies.

FIG. 9 shows a second implementation a system for active relationship management.

FIG. 10 shows a method by which the second implementation builds a database of quotes.

FIG. 11 shows a method by which the second implementation retrieves and processes articles.

FIG. 12 shows a method by which the second implementation creates synonyms for names of individuals.

FIG. 14 shows a method by which the second implementation creates synonyms for positions held by individuals.

FIG. 15 shows a method by which the second implementation creates a position thesaurus.

FIG. 16 shows a process by which the second implementation creates a name-position association file.

FIG. 17A-17I show examples of a user interface of the second implementation.

Like reference numbers and designations in the various drawings indicate like elements.

DETAILED DESCRIPTION

Figure 4A:
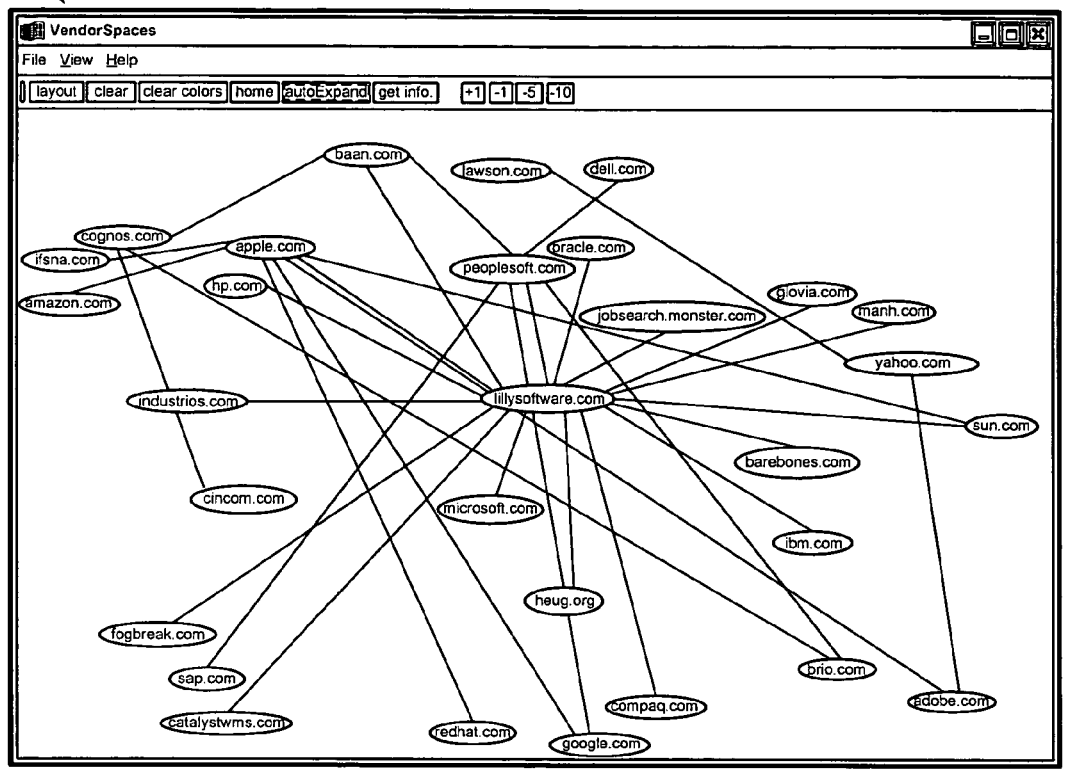
FIGS. 4A and 4B show displays of an industry space.

FIG. 1 shows a system 100 for active relationship management. As described below, the system 100 can build a database of quotes from persons of interest and, furthermore, process the quotes to obtain valuable information about these individuals and the companies that employ them. The system 100 includes a component 102 for processing information, a quote engine 104, a component 106 for storing data, and a component 108 for presenting information.

The system 100 can receive data, for example, from external sources such as a Web-based data aggregator that collects data and sends the collected data to the system 100. Alternatively, the data can be received from other sources. The received data can be structured or unstructured. Structured data is generally data that has an enforced composition to the atomic data types. Structured data is usually managed by technology that, for example, allows for querying and reporting against predetermined data types and understood relationships. Examples of structured data include an entry in a database table and electronic documents of RSS (Really Simple Syndication) news feed, the latter of which can include technical journals and business journals. Unstructured data is generally data stored in an unstructured format. With unstructured data, there is usually no conceptual definition and no data type definition. An example of unstructured data is information in a text document. Note that an electronic document does not necessarily correspond to a file. An electronic document may be stored in a portion of a file that holds other documents, in a single file dedicated to the document in question, or in multiple coordinated files. The system 100 can store the received data in the component 106.

The component 102 includes one or more applications that perform various functions. The component 102 includes, for example, one or more applications that execute in conjunction with the quote engine 104 to build and update a database of quotes. Each of the building and updating processes can include retrieving data received from external sources and stored in the component 106 and, furthermore, for parsing the data into units of information. Examples of units of information include and are not limited to words, phrases (for example, article headlines), sentences, paragraphs, and articles. The parsing is generally based on syntactic and grammatical rules. The component 102 can send the units of information to the quote engine 104 for immediate processing or, alternatively, store the units of data back in the component 106 for later processing by the quote engine 104. Each of the building and updating processes can also include determining whether a quote found in the above-described unit of information satisfies criteria. The criteria can be used to identify quotes that are of interest, for example, quotes from individuals identified as executives having decision making authority for business-to-business sales in a particular field. The criteria can be based on configurable rules and, furthermore, be definable by user or other components of the system 100. As will be further described below, the one or more applications of the component 102 can further process the quotes located, for example, identifying quotes that are of interest, grouping the individuals to whom the quotes are attributable, and grouping the companies that employ the individuals. Other functions that component 102 can perform include and are not limited to automatically assessing activity for business-to-business sales, predicting power shifts of executives of organizations of interest, and assessing relationships in a network of executives for networking purposes. Assessment is generally based on the received data, quotes found in the received data, and/or both. The functions are further described below.

The quote engine 104 is configured to search the units of information and locate quotes. The quote engine 104 locates quotes by searching for character strings and/or patterns of character strings that indicate the presence of a quote. Such character strings can include character strings that are typically used to refer to individuals, for example, Mr. Smith, character strings that are typically used to refer to a company, for example, Accenture, and character strings that are typically used to describe a person's position in a company, for example, Chief Technology Officer or CTO. Processing by the quote engine 104 can be done in batches, either periodically or in response to receipt of external data or user input. An example of the quote engine 104 and its functions are further described below.

The component 106 can include one or more storage devices, including, for example, the one or more disk drives of a server on which the component 102 and/or the component 104 execute. As described above, the component 106 can store units of information generated by parsing data received by the system 100. Additionally, the component 106 can include the above-described database of quotes. The database of quotes can include, for example, information specifying an individual, one or more quotes attributable to the individual, a company where the individual is employed, an industry associated with the company, the individual's position in the company, as well as other information about the individual. Information stored in component 106 can be accessed and processed by the applications of the component 102 through the use of, for example, SQL queries. The information in the database of quotes can be sorted and indexed.

The component 108 provides an interface in which it presents the quotes found and processed, as well as any assessments made by the above-described applications. By reviewing the quotes and assessments, one can evaluate current needs, status, and issues faced by persons of interests (e.g., company executives). Examples of the interface are described below.

FIG. 2 shows a method 200 by which a relationship management system such as the system 100 builds a database of quotes. The system receives data (step 205). The data can be, for example, text from articles and relate to a topic of interest, an industry of interest, or both. The data can be collected, as described above, by a data aggregator. To select the data to aggregate, the aggregator can use a list, which content can be static or dynamic and include information identifying companies of interest. Alternatively, the list can consist of all companies of a particular industry.

The system parses the data into units (step 210). The units include those described above. As mentioned above, parsing can be based on syntactic and grammatical rules. By way of example, the system parses text into sentences based on the occurrence of capitalized words and on characters that delimit sentences. Examples of delimiting characters include and are not limited to periods, question marks, and exclamation marks.

The system selects an unsearched unit of data and searches the selected unit of data for one or more quotes (step 215). As indicated above, the search technique employed can be based on character strings and/or patterns of character strings that typically indicate the occurrence of a quote. The following describes examples of classes of rules for finding a quote.

One class of rules specifies that there is a quote present in the unit of information being considered if the combination of (i) a character string typically used to refer to a person and (ii) a character string indicating an occurrence of a quote is found in the unit.

A character string typically used to refer to a person can generally include one or more of a proper name, a title, and a pronoun. These items can be stored in a first database table. The system, when performing the search for quotes, can access the first table and generate a first list of character strings that is used to conduct the search.

A character string indicating the occurrence of a quote generally can include quotation marks and/or various grammatical forms of one or more of the following words: say, predict, forecast, stress, tell, reply, agree, admit, according to, state, explain, and continue. The marks and words can be stored in a second database table. The system, when performing the search for quotes, can access the second table and generate a second list of character strings that is used in conjunction with character strings of the first list to conduct the search.

The contents of the first and second database tables described above can be generic, i.e., have typical names and titles. Such database tables are usually generalized and extensive lists of known names, titles, and words.

Note that the character string representing a person and the character string indicating the occurrence of a quote can occur in any order in the unit of information, and a search applying the rules of the instant class would determine that a quote exists in the unit of information being considered regardless of the order at which the above-described character strings occur in the unit. Table 1 provides an example of the above-described class of rules.

TABLE 1

// <name> says . . ., . . . says <name>, . . . <name> says
// OR
assert/affirm/maintain/reveal/declare/pronounce/speak/articulate/utter/
//
shout/verbalize/allege/held/hold/believe/assume/understand/understood/
// suppose/thought/think/whisper
// <name> * " . . . "
h// <name>/pronoun called . . .
// According to <name> . . .

Another class of rules specifies that there is a quote present in the unit of information being considered if the combination of (i) a character string representing a proper name of a person, (ii) a character string representing a company, and (iii) a character string indicating an occurrence of a quote is found in the unit.

A character string representing a proper name of a person generally includes one or more proper names, for example, a first name, a middle name, a middle initial, and/or a surname. A list of known proper names can be stored in a datable table, from which the system can build a list of character strings to search for quotes. The character string representing a proper name can be a subset of the above-described character string representing a person.

A character string representing a company generally can include text that are typically used to refer to a company, for example, a proper name, a suffix to a company name (Inc., AG, Corp., and Co.), and a company signifier (systems, group, resources, limited, and fund). A list of proper names for known companies can be stored in a database table, from which the system can build a list of character strings to search for quotes. Alternatively, the list can consist of only a group of companies, for example, those identified as belonging to a particular industry or industries of interest.

A third class of rules specifies that there is a quote present in the unit of information being considered if the combination of (i) a character string typically used to refer to a person, (ii) a character string typically used to refer to a company, and (iii) a character string indicating an occurrence of a quote is found in the unit. For the instant class and the previously discussed class of rules, as is the case with the first class, the rules are insensitive to the order in which the three types of character strings appear in the unit of information being considered.

Any combination of the above-described classes of rules can be implemented. Alternative permutations of the above described patterns can be also implemented. Other types of character strings can be used, as can other rules.

The system determines whether there are one or more quotes found in the selected unit of data (decision step 220). If there is not, then the system determines whether there are any remaining unsearched units of data (decision step 225). If there are no unsearched units of data (NO branch of decision step 225), then the system has completed method 200. Otherwise, the system selects an unsearched unit of data and searches the selected unit of data for one or more quotes according to the mentioned criteria. That is, the system repeats step 215 and subsequent steps of method 200 as appropriate.

If there are one or more quotes found (YES branch of decision step 220), then the system selects a quote found (step 230). The system determines whether the quote satisfies criteria, for example, being attributable to an individual associated with a company on the above-described list (step 235). The criteria can be those described above with respect to the component 102. If the quote satisfies the criteria, then the system associates the quote with relevant information (step 240), for example, attribute the quote to the individual and/or the company, and the system stores the quote and its associated information in the database of quotes (step 245). Otherwise, the system simply discards the found quote (step 245). Alternatively, the system can store the found quotes that do not satisfy the criteria and their respective related information. The system determines if there are more quotes found for the unit of data being considered (decision step 250). If there are more quotes found (YES branch of decision step 250), then the system repeats step 230 and subsequent steps of method 200 as appropriate. If there are no other quotes found in the unit of data being considered (NO branch of decision step 250), then the system is done with the current unit of data and determines if there are more unsearched units of data (step 225).

The database of quote built as described above can be updated by gathering additional data of interest and processing such data by performing again the above-described method 200. Updates can be performed periodically or in response to user input.

FIG. 3 shows a system 300, which is an implementation of the system 100. The system 300 includes a component 302 for defining an industry space of interest, a component 304 for identifying individuals associated with the defined industry space of interest, a component 306 for collecting data related to the individuals, a component 308 for processing the collected data, the quote engine 104, a component 310 for presenting information, and a database 312.

The component 302 uses one or more search engines to define an industry space of interest. Search engines include a frequently updated index of an extremely large number of documents. By using the search function, related function, or both the search and related functions of search engines, for example those of Google and altavista, the component 302 generates a set of URLs that most commonly co-occur with an input URL and/or key word.

Implementation of the search and related functions can vary from search engine to search engine. In general, however, these functions include an analysis of link structures. Table 2 shows examples of rules that the component 302 uses to determine whether two entities, for example, companies, are related.

TABLE 2

A first company X is related to a second company Y if any of the following are satisfied.
 1. Their URLs co-occur within one or more Web pages as reported by, for example, public search engines like Google and altavista. That is, search($\{X, Y\}) \neq \emptyset$
 2. Their URLs co-occur within one or more authoritative Web pages as measured, for example, by a related function. That is, $X \in$ related(Y)
 3. They co-occur in directories of a search engine, for example, Google, Yahoo, Yahoo Finance, Open Directory Project, Look Smart, or Netscape. That is, dir(X) $\cap$ dir(Y) $\neq \emptyset$ Optionally, the component 302 detects domain-specific relations, for example, co-occurrence in a domain-specific publication like Red Herring articles as reported by Red Herring's search engine, and appearance in company profiles at finance portals. Finance portals, for example, CNBC, Hoover's, and Quicken generally provide profiles of companies and lists of news articles about a particular company.

Company profiles include references to other companies and, thus, can be used to yield related companies. News yield a set of stories, each of which can include references to other companies. Table 3 shows examples of rules that the component can use to determine relationships.

TABLE 3

The first company X is related to the second company Y if either of the following is satisfied.
 1. The first company name is mentioned in a profile of the second company name. That is, $X \in$ profile(Y)
 2. The first company name X appears in a news story about the second company Y. That is, $X \in U_{news(Y)}$ The relations can be weighted, normalized, and summed. Weights are added both within relations and across relations. For example, within the relations found from using the related function, the weight of X-Y is proportional to X's distance from the front of a list returned by related (Y) function because search engines sort by relevance. Other relations, like profile, are weighted inversely to the number of companies returned. This inverse weighting gives more weight to small profiles, for example, those from Hoovers.

Weights across relations determine the importance of sources. For example, search$_{Redherring}$( ) can be weighted higher than search$_{altavista}$( ). After the relations are summed, a minimum threshold is a defined such that relationships with a weight less than a threshold are omitted. The above described process yields a result set of companies, ranked by weight.

Optionally, the component 302 can further refine the ranking by using abstract similarity metrics. The component 302, for example, can refine ranking based on similarity of the companies' book, music, video, DVD, toy, and electronic purchase circles on Amazon.com. Product circles are ordered lists of products. The book product circle for IBM, for example, is a list of the books most frequently sold to people at IBM. The music product circle for MIT is a list of music titles most frequently sold to people at MIT. The component 302 can treat the product circles as sets, and similarity (if any) as proportional to the size of the intersection between sets. That is, $$Sim(X,Y) | ProductCircle(X) \cap ProductCircle(Y) |$$

The component 302 can also refine the ranking by looking to the number of common task-specific key words, for example, "B2B" and "eCommerce." If X and Y, for example, have a large number of Web pages including these two words, then X and Y are similar. The component 302 can normalize these numbers of pages as a percentage of the total number of pages at the company, as a percentage of the total number of pages anywhere that include the task-specific key words, and relative to a benchmark Web site like Red Herring.

In general, given an input node (e.g., a company of interest), the component 302 can iterate through executions of search and related functions over a bounded set of sub-nodes to generate a large network of related URLs. Given the input company of interest with a particular URL, for example, the component 302 repeatedly performs the above described search and relate functions to produce a resulting set of related entities. The component 302 can then perform the described search and related functions on each of the entities of the resulting set to produce multiple resulting sets. The component 302 iterates the process for each element of each resulting sets to produce the mentioned large network of related URLs. The component 302 can be configured to stop the iteration at any point. For example, a limit can be set on the number of expansions or on the maximum size of the resulting set. The appropriate stopping point can be empirically determined so as to produce a useful large network of URLs and, furthermore, can depend on the particular industry space.

FIG. 4A shows a network 402, which is an example of a large network of URLs. Included in the network 402 are organizations related to www.peoplesoft.com.

Figure 4B:
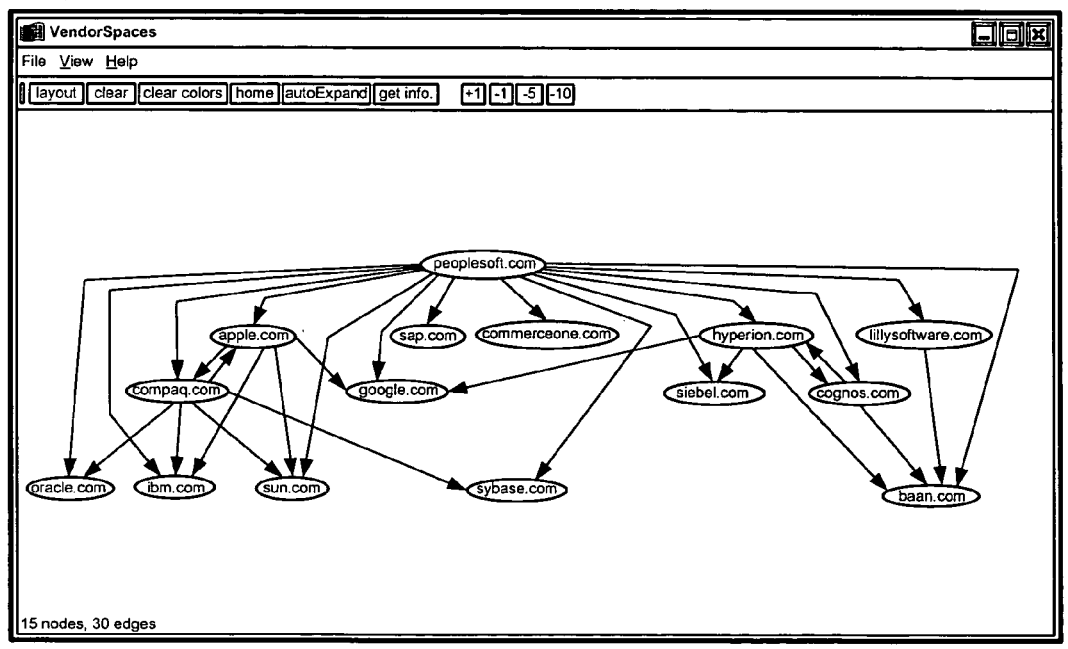
Figure 8A:
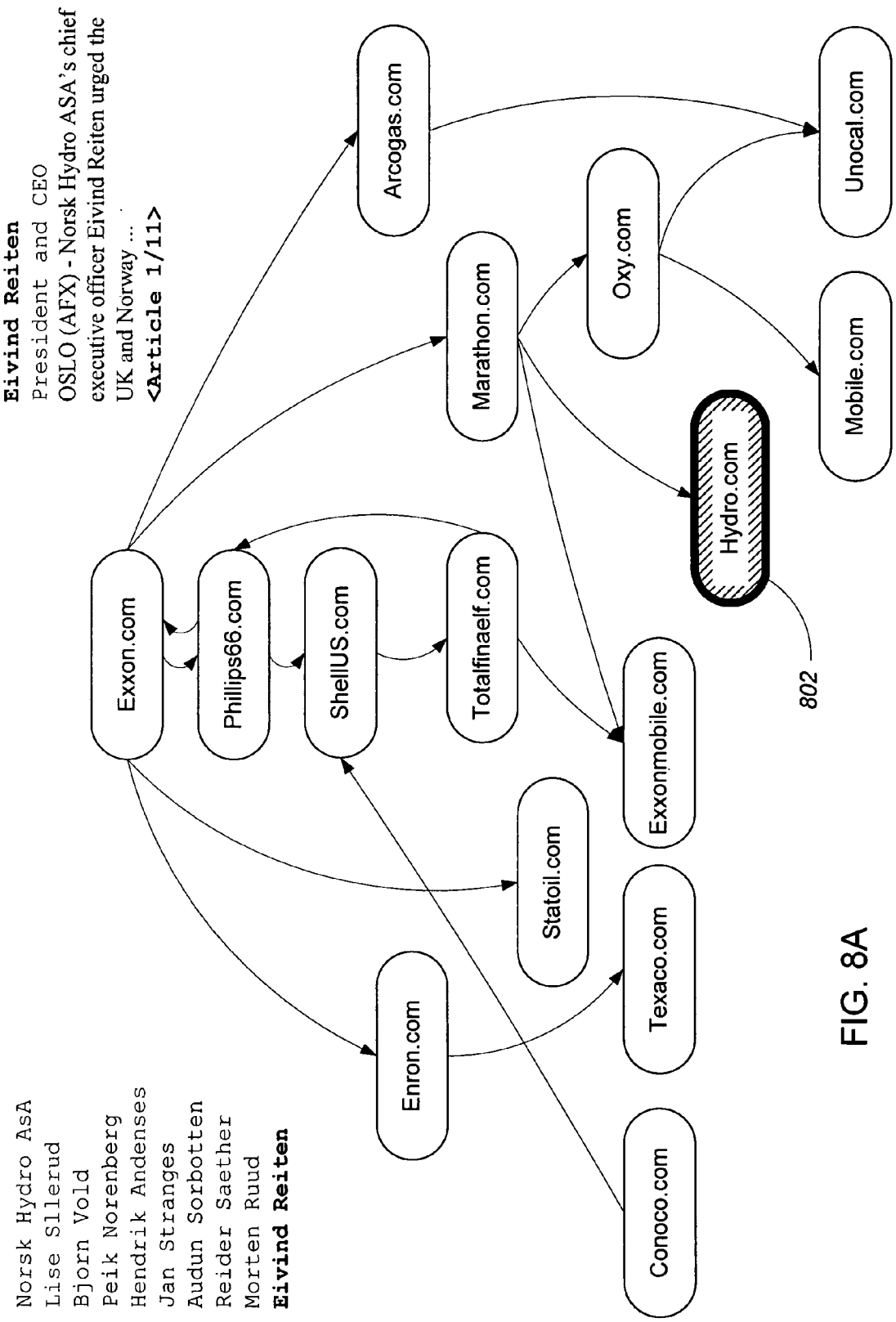
FIGS. 8A-8H show examples of an interface that displays an industry space of interest.
Figure 8B:
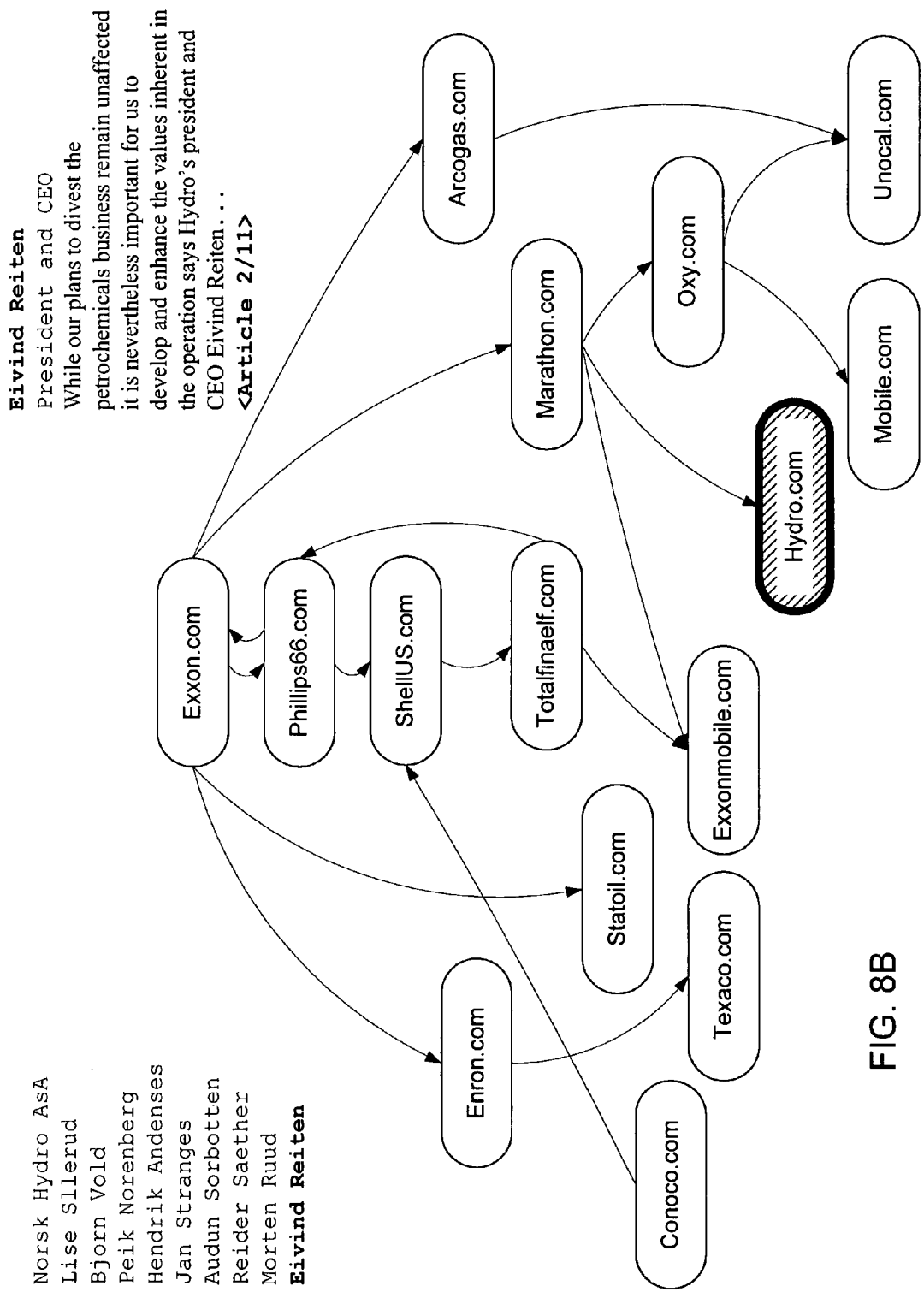
Figure 8C:
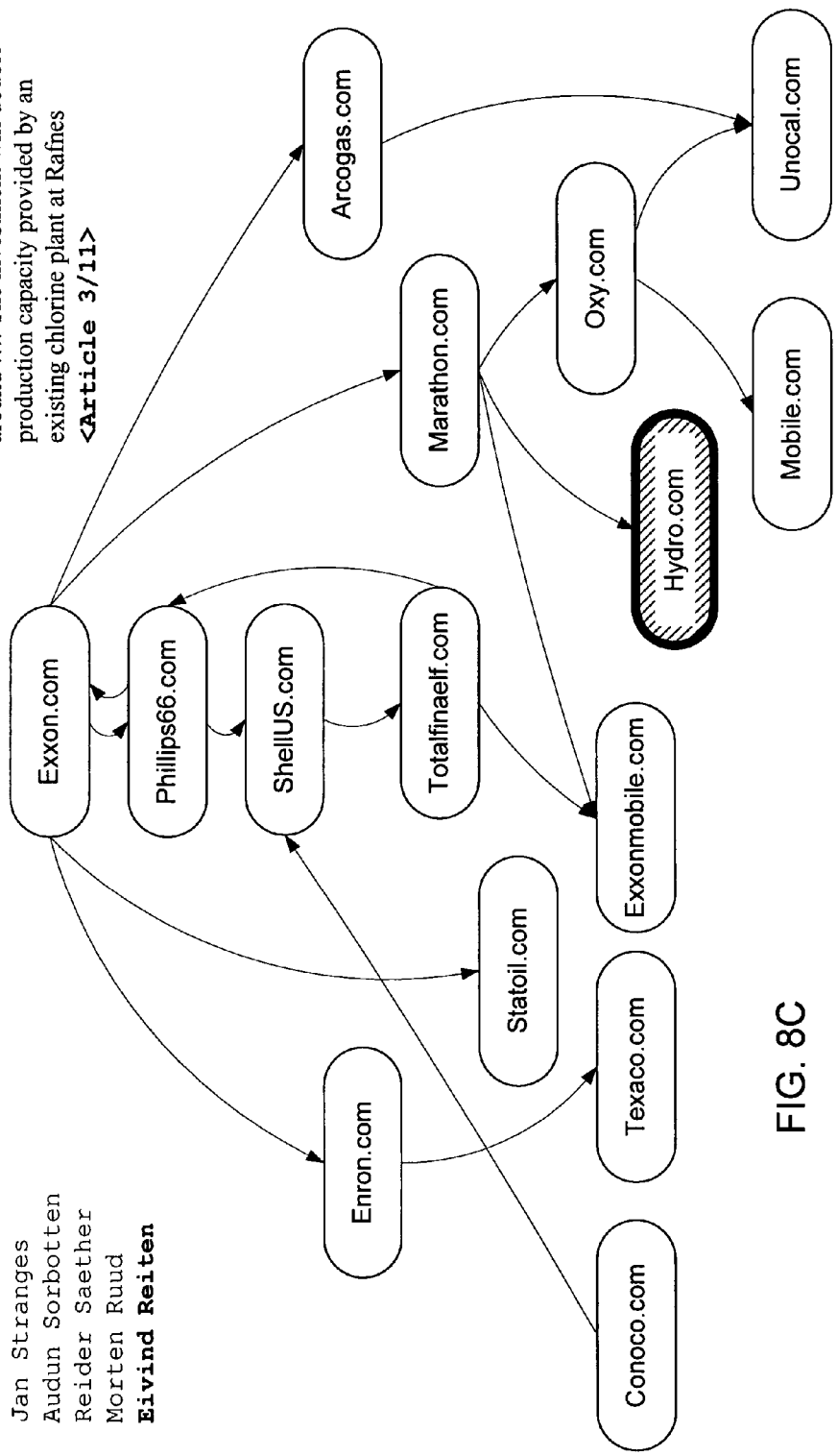
Figure 8D:
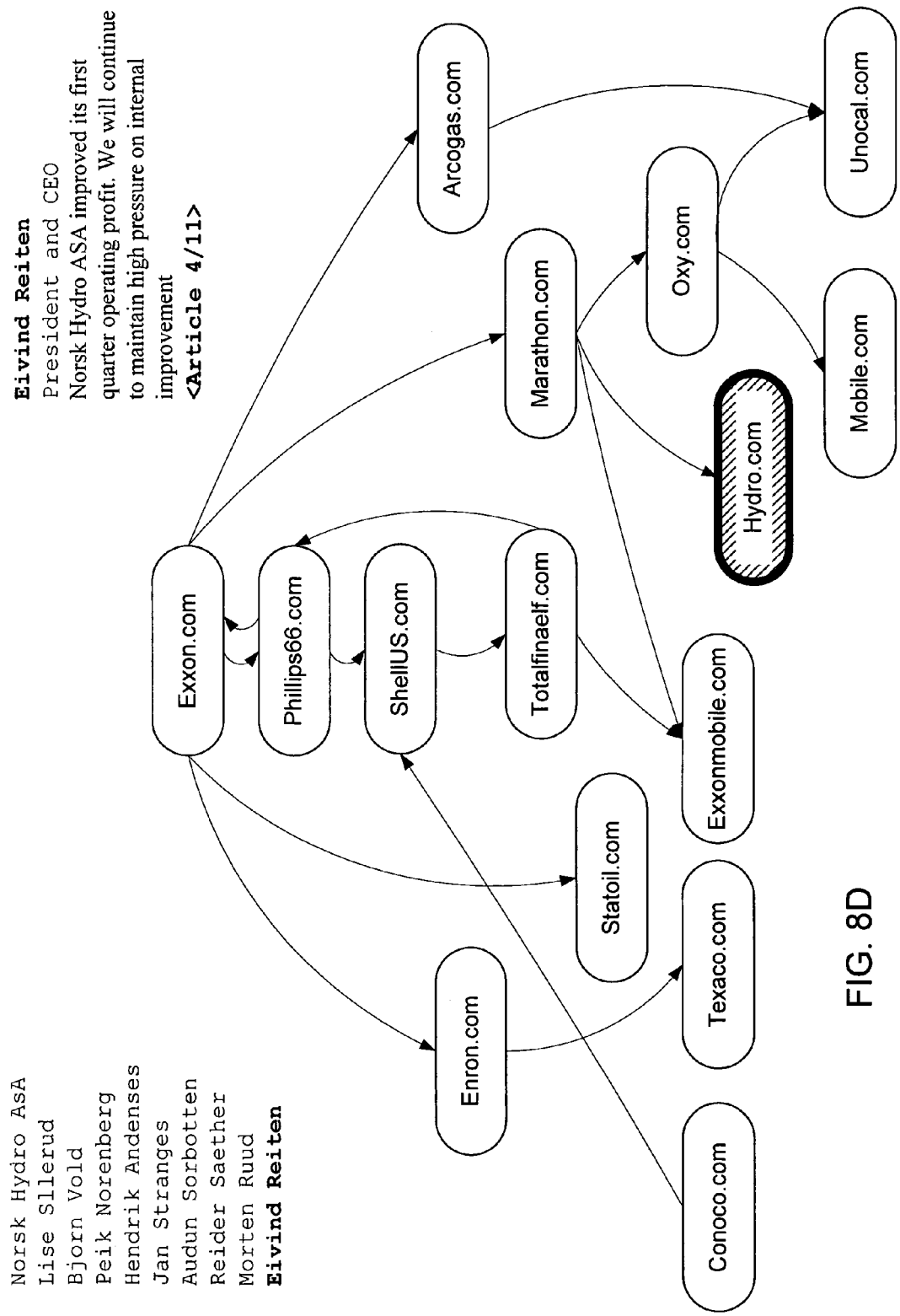
Figure 8E:
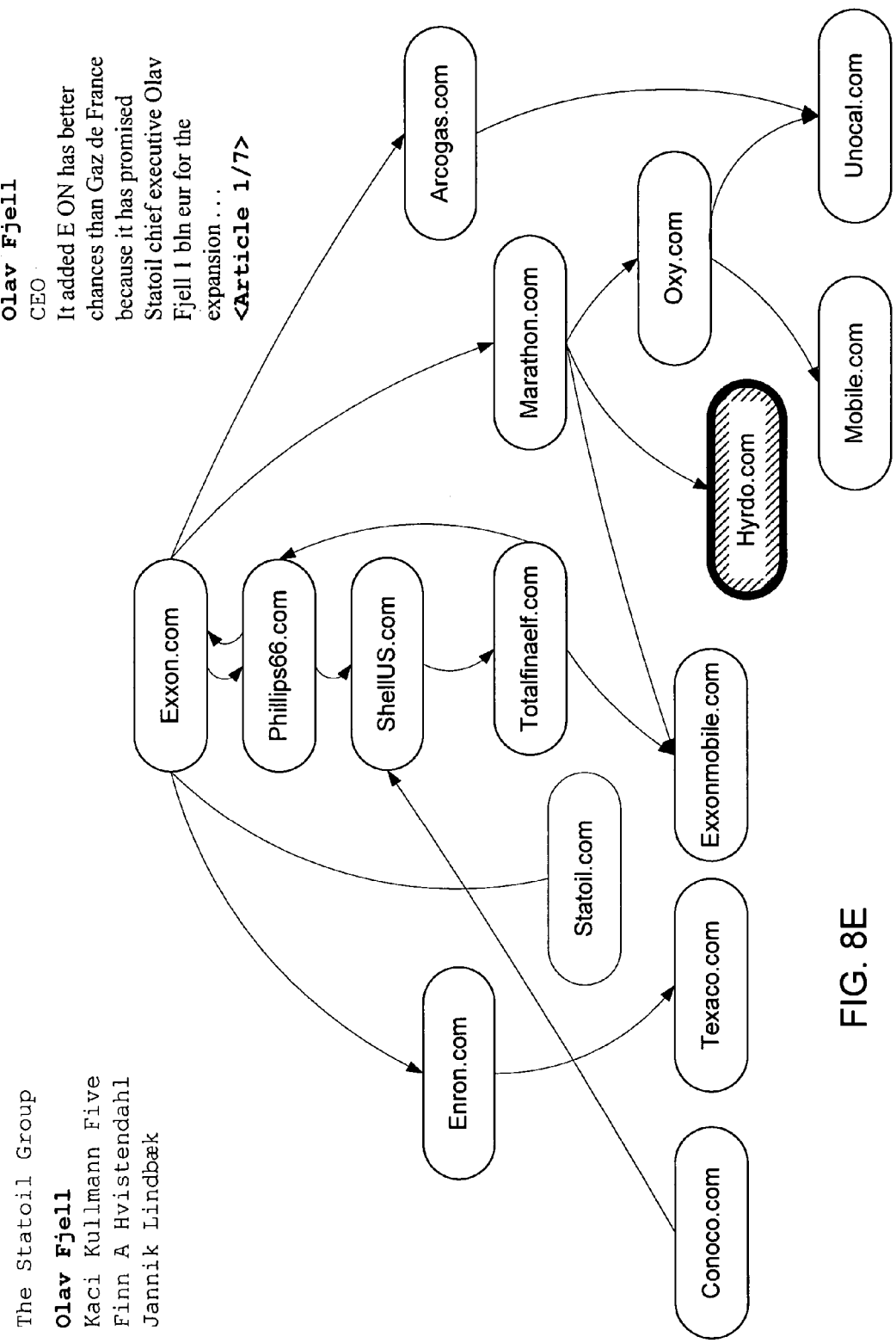
Figure 8F:
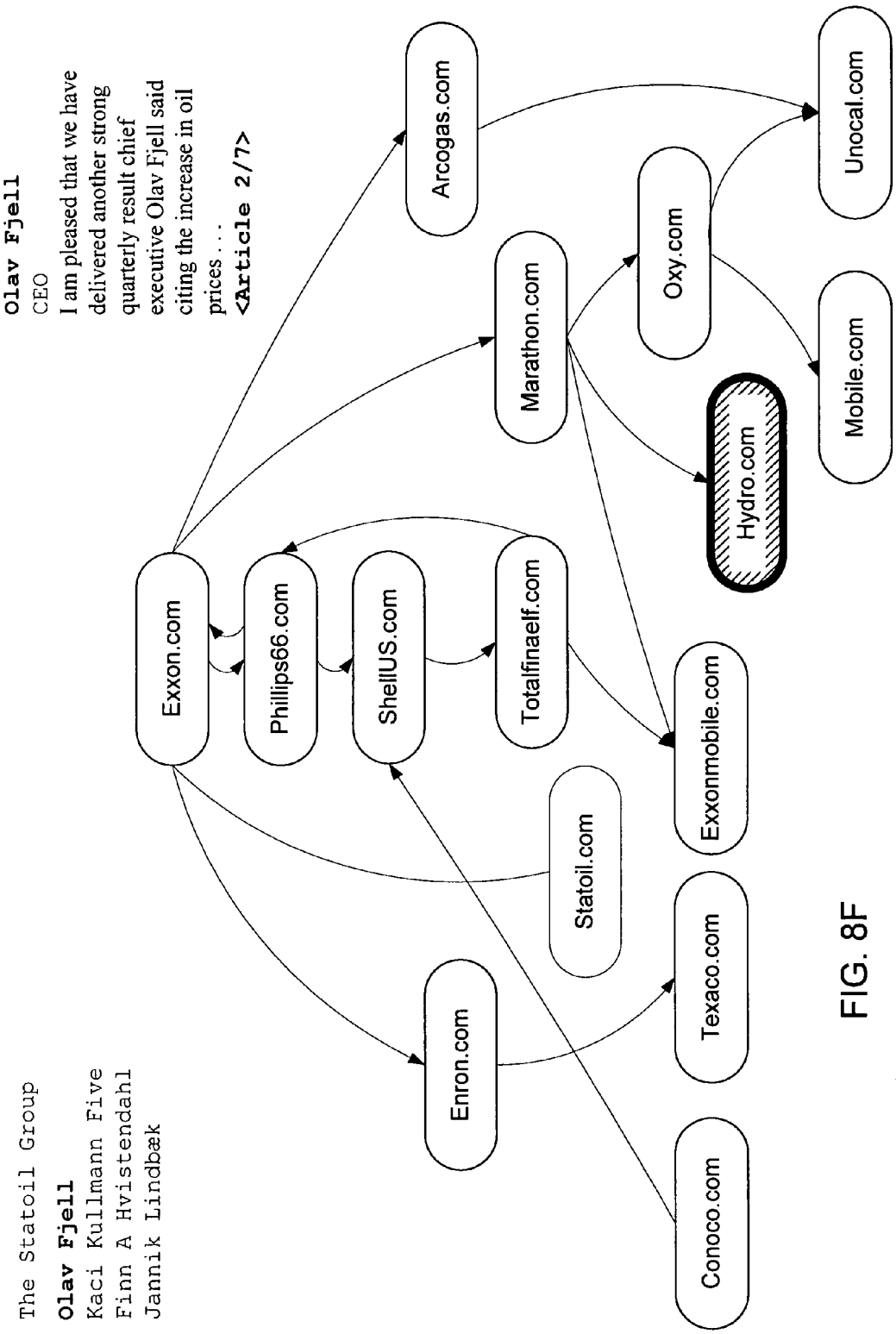
Figure 8G:
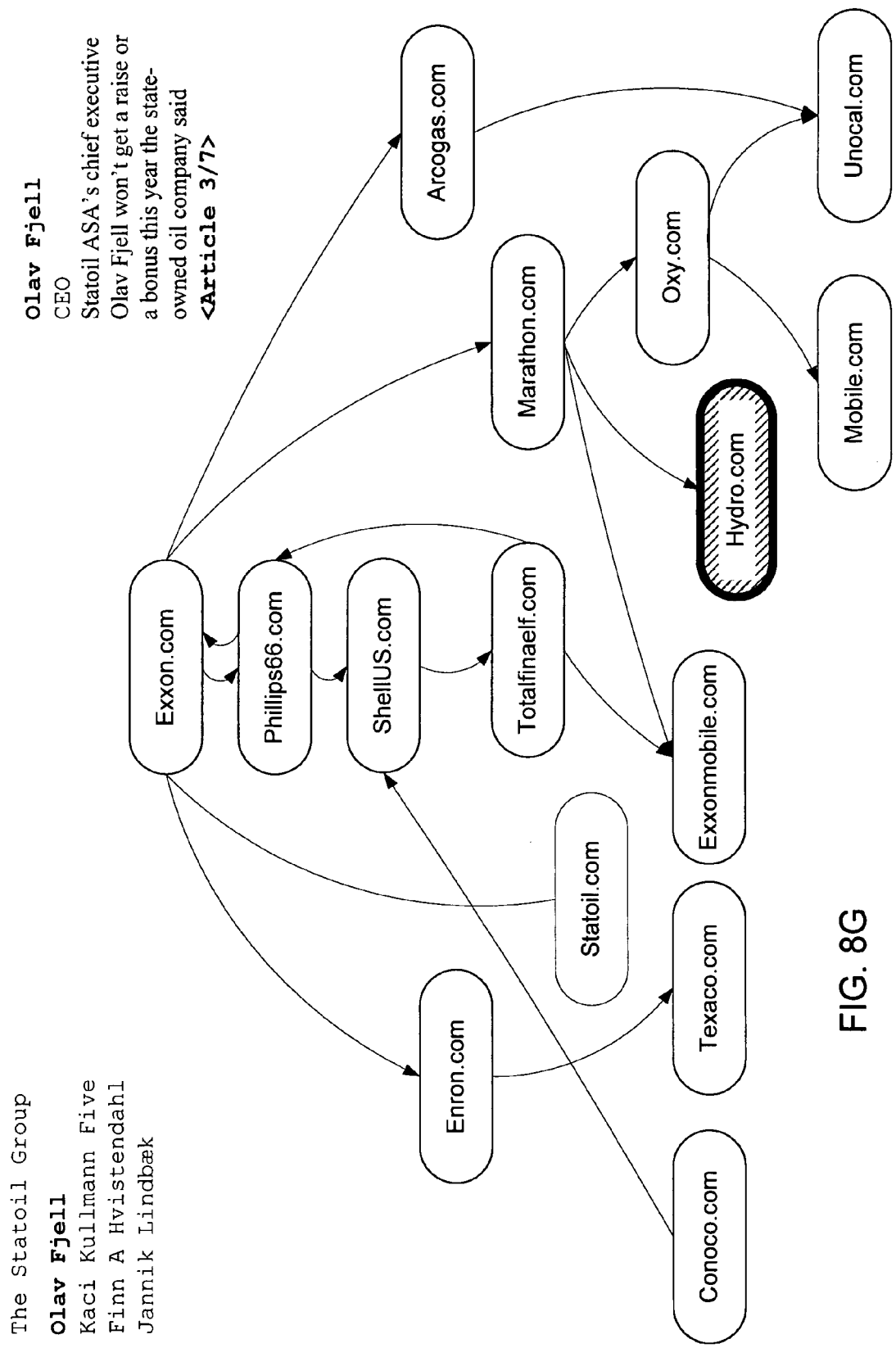
Figure 8H:
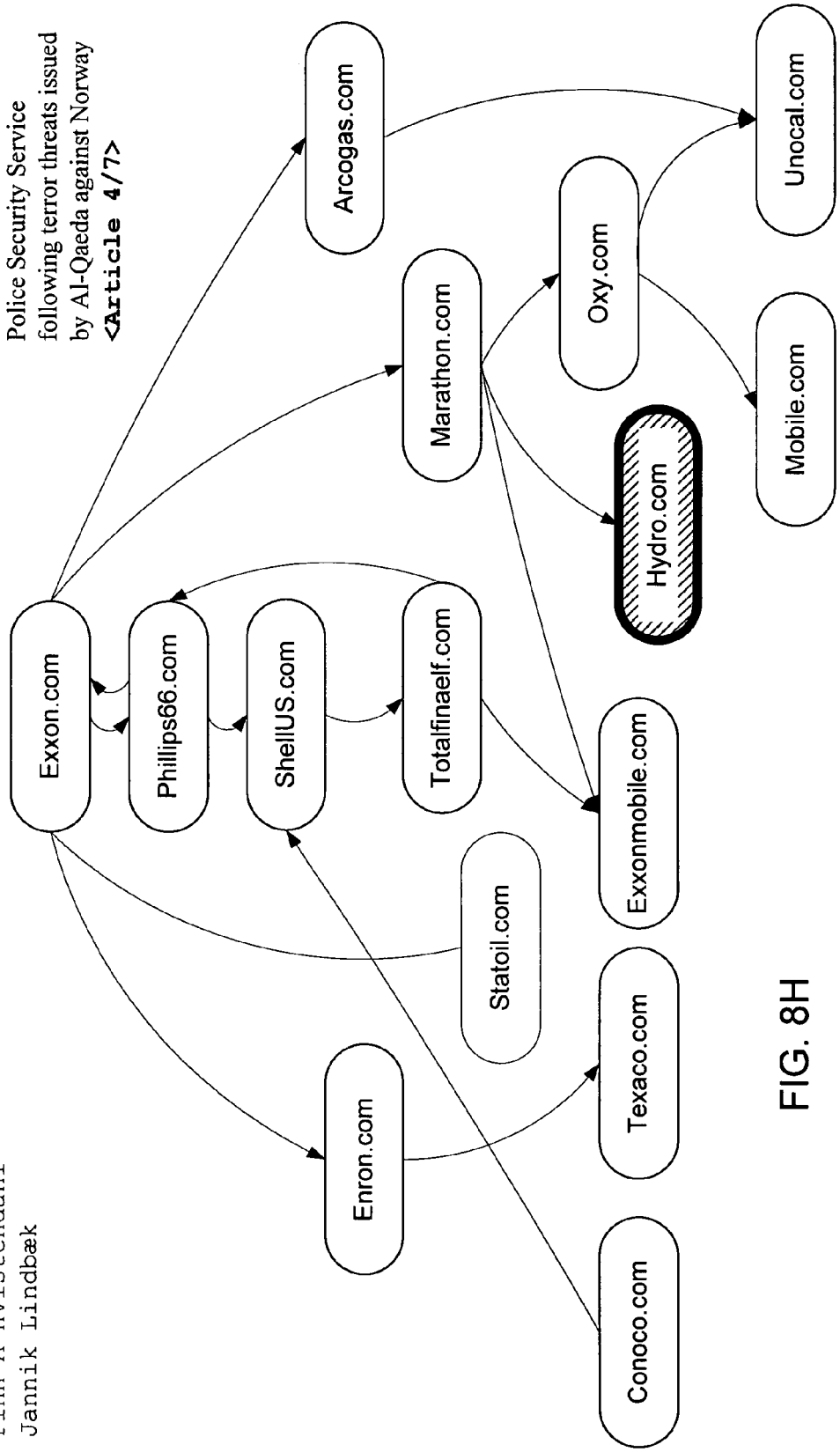

The large network is then pruned by removing the least connected URLs (for example, URLs having the fewest incoming and outgoing links). At the end of this process, what is left is a reasonably small network of the input company of interest and the most related organizations around it. FIG. 4B shows a network 404, which is an example of a small network.

The component 304 (FIG. 3) identifies individuals, for example, executives, who are associated with any of the companies identified by the component 302. The component 304 can include a data aggregator that collects executive names and associates them to companies. Given a list of companies, the components 304 retrieves names of executive of the company.

The component 306 collects data related to the industry space identified by the component 302. The component 306 can include a data aggregator such as the above-described Web-based aggregator. The data can include news feed, technical journals, and business journals. To select the data to aggregate, the component 306 can use a list, which content can be static or dynamic and include information identifying companies of interest. Alternatively, the list can consist of all companies of a particular industry.

As shown in FIG. 5, the component 308 includes an application 502 for building and updating a database of quotes, an application 504 for predicting power shifts, an application 506 for assessing activity of a company, and an application 508 for tying quote relationships among the executives.

The application 502 takes the collected data and parses the data into units of information as described above with respect to the component 102. The application 502 works in conjunction with the quote engine 104 to build and/or update a database of quotes. This process is similar to the above-described method 200. The data in which the system searches for quotes is the data collected by the component 306.

The application 506 analyzes the quotes found to assess a level of activity for a particular company. The level of activity can indicate that the company is receptive to solicitations for business-to-business sales. The level of activity can be based on the frequency of quotes attributable to employees of the company, the company position of the individual to which quotes are attributed, and/or a combination of both the aforementioned. A higher frequency of quotes from high level executives can, for example, indicate a high level of activity. A low frequency of quotes from low level executives can indicate a low level of activity.

The application 504 analyzes the quotes found to predict power shifts between or among executives of the company. An executive frequently quoted, for example, probably has authority and power. An executive not often quoted probably has little or no power. By tracking trends of quote frequency attributable to each executive in a company, the application 504 can predict who among the executives are gaining and who are losing power.

The application 508 analyzes the quotes found to tie executives who are mentioned in a same publication. Although employed by different companies, the executives can be grouped together to indicate that they share a common thread, for example, a concern described in the publication. Companies of executives mentioned in a same publication are identified and likewise grouped. Executives and companies that are grouped together can be highlighted in a same color on a display.

Optionally, the component 308 can include other applications, including one that groups individuals based on the number and frequency of quotes that are found in publications of interest and that are attributed to the individuals, on the titles of the individuals, and/or on the companies associated with the individuals.

The component 310 (FIG. 3) for presenting information provides one or more user interfaces. Examples of the user interfaces are described below. The database 312 can be relational or otherwise. The database can include one or more tables, including one for listing individuals of interest and one or quotes attributed to individuals of interest. The database can be indexed, and information in the database can be processed querying the database.

FIG. 6 shows a method 600 by which the system 300 builds a database of quotes. The component 302 defines an industry space of interest (step 602). The component 502 identifies the companies included in the industry space and builds a list of companies (step 604). The component 306 uses the list to aggregate data about the companies (step 606). The component 502 parses the aggregated data and then works in conjunction with the quote engine 104 to find quotes (step 608). The component 502 processes the quotes found and stores the quotes along with any associated information in the database 312 (step 610). Examples of information associated with a quote include information about an individual to which the quote can be attributed, the company that employs the individual, the position of the individual, and one or more industries to which the company belongs. Information about an individual can include information that describes variations of names that can be used to refer to the individual. Likewise, information about the position can include information describing variations of words that can be used to refer to the position, and information about a company can include information describing variations in names that can be used to refer to the company. Data in the database 312 can be operated on by SQL queries and evaluated to facilitate relationship management, for example, assessing the activity of particular companies.

FIG. 7 shows a method 700 for assessing activities of companies in an industry space of interest. The system 300 receives information specifying an industry of interest (step 702). The component 302 defines an industry space for the industry of interest (step 704). The component 308 identifies and builds a list of companies included in the industry space (step 706) and queries the database 312 for entries including companies on the list (step 708). The component 308 analyzes the results of the query and makes an assessment of the level of activity for a company based on quotes attributed to employees of the company (step 710). Analysis can include calculating the number of quotes found and/or a frequency at which the quotes occurred for a particular company. The component 310 displays results of the analysis, including the company and the indication (step 712). Indication can be a color coding scheme where particular colors are displayed with particular levels of assessed activity.

FIGS. 8A-8H show an example of an interface that displays an industry space of interest. In FIGS. 8A-8D, the interface displays the executives for Hydro and a color coding (or pattern fill) indicates that CEO Eivind Reiten has the most quotes. Moving a cursor or pointer over Eivind Reiten shows that he has 11 quotes. A quick perusal of the quotes show that there are four primary current issues facing Eivind, specifically:

1. Agreement on a joint energy treaty: "Norsk Hydro ASA's chief executive officer Eivind Reiten urged the UK and Norway energy minister to reach an agreement on a joint energy treaty soon so that work can proceed to build a direct pipeline linking the Ormen Lange field . . . "

2. Divestiture of petrochemicals business: "While our plans to divest the petrochemicals business remain unaffected it is nevertheless important for us to develop and enhance the values inherent in the operation says Hydro's president and CEO Eivind Reiten."

3. Building of new plants: "Norsk Hydro ASA said its board today approved the construction of a new chlorine plant at Rafnes estimated to cost around . . . . The investment will double production capacity provided by an existing chlorine plant at Rafnes."

4. Earnings results: "Norsk Hydro ASA improved its first quarter operating profit. We will continue to maintain high pressure on internal improvement programs and stringent capital discipline said President and CEO Eivind Reiten."

"In 2003 Reiten's pay is due to rise to some NOK63m according to the Norwegian newspaper Aftenposten."

As shown in FIGS. 8E-8H, a similar perusal of quotes for Statoil's CEO, Olav Fjell shows the following pertinent issues:

1. Sale of assets: "It added E ON has better chances than Gaz de France because it has promised Statoil chief executive Olav Fjell 1 bln eur for the expansion of gas fields if the acquisition takes place."

"More recently it has been suggested the equity could be swapped for oil and gas assets abroad. But Olav Fjell executive of Statoil said he was cool on the idea of a strategic placement. With the big oil and gas companies now concentrating on profitability rather than production target assets are up for sale Fjell said."

2. Earnings results: " I am pleased that we have delivered another strong quarterly result chief executive Olav Fjell said citing the increase in oil prices in advance of the way in Iraq and an increase in natural gas sales."

3. Salary raises: "Statoil ASA's chief executive Olav Fjell won't get a raise or a bonus this year the state-owned oil company said."

"Statoil ASA's board members could be fired if they increase chief executive officer Olav Fjell's wage said trade and industry minister Ansfar Gabrielsen."

4. Terror threats (From Wenche Skorge—VP Media Relations): "Statoil ASA said it has requested advice from the Police Security Service following terror threats issued by Al-Qaeda against Norway yesterday reported daily Dragens Neuringsliv. Statoil spokeswoman Wenche Skorge told the daily that Statoil has contingency plans which will be implemented at the request of authorities but would not speculate as to which installations would be probably terror targets."

There are similarities in the concerns for both executives including their earnings, salary, and asset-sales. Hydro, however, is still investing some funds in new infrastructure while Statoil is more cautious. In addition, Statoil is concerned about terrorist threats, and one might project that Hydro is concerned over the same issue as well.

As demonstrated above, in addition to getting the vocabulary used by executives to describe their needs, the display provides a quick summary of the most pertinent issues to the executives. This display capability gives users awareness of the needs of their customers. Note that the above described quote engine does not merely extract quotes by an executive; it can also extract quotes that are about the executive, as well as quotes that are close in proximity to the executive name. These "related quotes" often contain important information about the needs and issues faced by an executive.

In addition to quotes, the system's people awareness is enhanced by tying the people quotes network to the organizational network. By way of example, a yellow halo 802 is shown around the organization that contains the current selected executive, as well as around all other organizations that contain executives who are in the same article as the selected executive. This allows users to quickly see the quote relationships among the executives in the industry map within the context of the organizational relationships within that map. In FIG. 8, none of the executives in the industry space appear in articles within the last three months with Hydro CEO Eivind Reiten. Thus, only Hydro has a yellow halo around it.

FIG. 9 shows a system 900, which is an implementation of the system 100. The system 900 includes an active relationship management application (ARMApp) 902, an ARM database 904 (ARMDB), a quote discovery module 906, an interface 908 with one or more data sources, a name thesaurus module 910, a position thesaurus module 912, and a name-position association module 914.

FIGS. 10-17I show methods performed by the system 900. FIG. 10 shows a method 1000 by which the system 900 builds or updates ARMDB. When tasked to update the ARMDB, ARMApp finds variations of names and positions listed in ARMDB (step 1002). Step 1002 is usually not performed for a build of the ARMDB because, prior to the build, ARMDB is usually unpopulated. ARMDB, after it has been built, includes a table, labeled as the Person table, which lists all individuals currently included in the database. An entry in the table represents an individual and, furthermore, includes a canonical name for the individual, a unique identification for the individual, and a position the individual holds in a company. In the instant step, ARMApp works in conjunction with the name thesaurus module to find one or more synonyms for the canonical name included in an entry and adds any synonyms found to the entry. Synonyms for a canonical name represent variations of the canonical name by which the individual can be referred. ARMApp works in conjunction with the position thesaurus module 910 to find one or more synonyms for the position included in an entry and adds any synonyms found to the entry. Synonyms for a position represent various ways by which the position can be referred.

When an entry has been processed for synonyms, ARMApp can flag the entry to preclude further processing for synonyms. As will be discussed below, the quote discovery module 906 can use the synonyms of names and positions to disambiguate character strings that, although not exactly the same, refer to a same individual.

ARMApp builds a list of companies (step 1004). Companies of the list can be selected based on user input. For updates, companies included in the list are companies currently included in the ARMDB. For the initial build, when the ARMDB does not include any entries (and, hence, no companies), the list can be built by including the Fortune 500 companies, their competitors, and the competitors of the competitors. Alternatively, the list can be built by the process for defining an industry space (described above in reference to FIG. 3).

Optionally, the ARMApp can add companies to the list. ARMApp can, for example, receive a user selection of a company and add this company to the list.

ARMApp retrieves articles about the companies of the list (step 1006). In general, ARMApp identifies the companies on the list to the data source 908, for example, OneSource, which is a Web-based data aggregator. The data source 908 provides articles about the companies to ARMApp.

The articles are then processed to locate quotes (step 1008). ARMApp sends each article to the quote discovery module 906, which uses the above-described classes of rules to search each sentence in the article being processed and return: (i) any quote found, (ii) references to a person associated with the quote, and (iii) information about the person. One example of the quote discovery module is ActiveRelationship Discovery Module (ActiveRelationship DM) available from ClearForest Corporation of Waltham, Mass. ActiveRelationship DM runs on the ClearTags platform, which is also available from Clear-Forest Corporation.

As part of its extraction process, the quote discovery module 906 uses the above described synonyms to disambiguate character strings representing names that, although not exactly the same, refer to a same individual. By having access to the synonyms, ActiveRelationship Discovery Module can determine that John C. Smith and John Smith, for example, probably refer to a same individual or that John Smith, Vice President and John Smith, VP refer to a same individual.

Optionally, the quote discovery module 906 can use an association between an individual's name and position to disambiguate character strings that, although similar or are the same, refer to different individuals. This step is useful when an article being process includes quotes from individuals having the same or similar names.

ARMApp processes the information returned by the quote discovery module and updates the ARMDB (step 1010). Updating includes adding to the ARMDB new quotes and individuals found in the articles processed in step 1008. Optionally, ARMApp can, before adding an entry for an individual to the ARMDB, determine whether the individual already has an entry in the ARMDB. The determination can be based, for example, on a comparison of a hash value for the individual under consideration with hash values of entries already in the above-described Person table. The hash value can be derived from the information about the person, for example, the person's name, position, and employer.

FIG. 11 details the method by which articles are retrieved and processed. In one implementation, articles are retrieved and processed in batches of 25. Alternatively, there can be fewer or more articles per batch. For each article of a current batch, ARMApp submits an identification of the article to OneSource by using a web service (step 1102).

OneSource returns the article corresponding to the submitted identification (step 1104). The article is returned as an HTML file by using the web service.

ARMApp submits the HTML file to ActiveRelationship DM (step 1106), which extracts quotes and, for each quote, information about the individual associated with the quote, e.g., a proper name, a identification of an individual to whom the name and the quote is attributed, a position associated with the name, and/or a company (step 1108).

As discussed above, ActiveRelationship Discovery Module uses the above described synonyms to disambiguate character strings representing names that, although not exactly the same, refer to a same individual (step 1110). ARMApp provides the synonyms in a name thesaurus file and a position thesaurus file. These two files are further discussed below. ActiveRelationship Discovery Module can use associations between an individual's name and position to disambiguate character strings representing names that, although similar or are the same, refer to different individuals. ARMApp provides information about the association in a name-position association file, which is further discussed below.

ActiveRelationship DM returns an XML file with quotes and the information associated with the quote (step 1112). ARMApp processes the XML file and stores the appropriate information in the ARMDB (step 1114). Processing includes parsing the XML file and determining, for each quote, whether the quote already has an entry in the ARMDB and whether the individual to which the quote is attributed already exists in the ARMDB. Quotes and individuals not already included are added to the ARMDB.

FIG. 12 details the method for creating synonyms for names of individuals in the ARMDB. ARMApp queries ARMDB and retrieves entries of the Person table (step 1202). As discussed above, an entry in the table includes a canonical name of an individual and an identification for the individual. If the entry has been process by the instant method, i.e., synonyms of the canonical name in the entry have been assigned, then the entry includes the synonyms. The entries retrieved are those or which synonyms have not been assigned. As discussed above, a flag can indicate whether the entry has been processed for synonyms. For each entry selected for retrieval, ARMApp retrieves the canonical name and the identification of the individual represented by the entry. The information retrieved is written to a text file and submitted to the name thesaurus module 910 (step 1204). The name thesaurus module uses a list of known names to find permutations and variations of each of the submitted names (step 1206). For each canonical name submitted, the name thesaurus returns three synonyms in an XML format (step 1208). Alternatively, fewer or more synonyms can be returned, and other formats can be implemented. ARMApp processes the results returned and updates the entries in the table (step 1210). In particular, ARMApp populates the unpopulated synonym fields of each entry.

Figure 13:
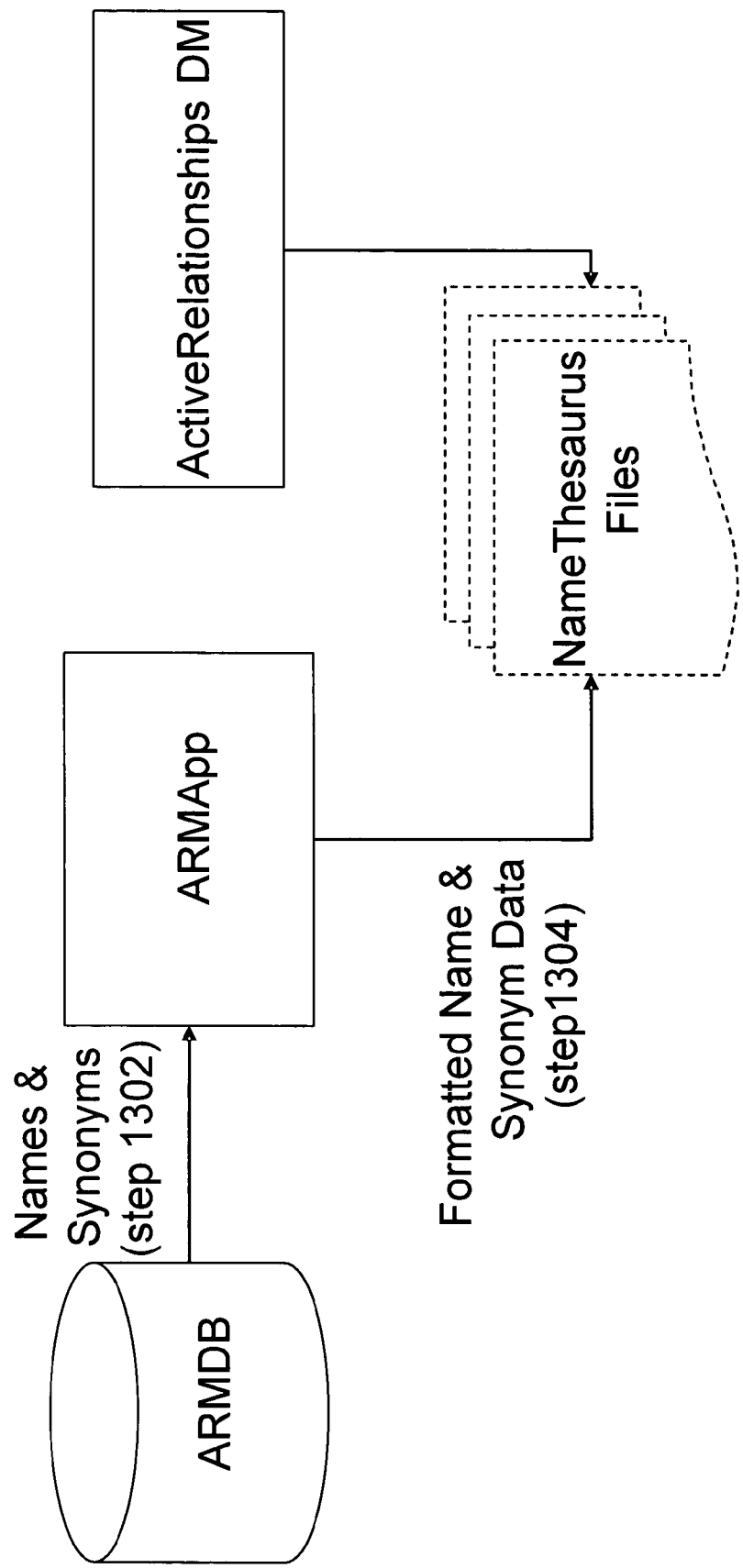
FIG. 13 shows a method by which the second implementation creates a name thesaurus.

FIG. 13 shows a method for creating a name thesaurus, which is done per batch of articles. For each company in a current batch, ARMApp queries ARMDB and retrieves all entries from the Person table that are associated with the company (step 1302). The information retrieved for each entry includes the canonical name and synonyms (if the entry includes synonyms). ARMApp writes the retrieved entries in a name thesaurus file, which is a text file that is accessible to the ActiveRelationship DM (step 1304). When the ActiveRelationship DM processes the articles of the current batch, it can use the information in the name thesaurus file to disambiguate character strings that refer to a same person.

FIG. 14 details the method for creating synonyms for positions of individuals in the ARMDB. ARMApp queries ARMDB and retrieves entries of the Person table (step 1402). As discussed above, an entry in the table includes a position the individual holds in a company. The entries retrieved are those or which position synonyms have not been assigned. As discussed above, a flag can indicate whether the entry has been processed for synonyms. For each entry selected for retrieval, ARMApp retrieves the position of the individual represented by the entry. The information for each entry retrieved is written to a text file and submitted to the position thesaurus module 914 (step 1404). The position thesaurus module 914 uses a list of known positions to find permutations and variations of the submitted positions (step 1406). For each position submitted, the position thesaurus module 914 returns three synonyms in an XML format (step 1408). Alternatively, fewer or more synonyms can be returned and other formats can be implemented. ARMApp processes the results returned and updates the entries in the Person table (step 1410). In particular, ARMApp populates the unpopulated synonym fields of each entry.

FIG. 15 shows a method for creating a position thesaurus, which is done per batch of articles. For each company in a current batch, ARMApp queries ARMDB and retrieves all entries from the Person table that are associated with the company (step 1502). The information retrieved for each entry includes position and synonyms for the position (if the entry includes synonyms). ARMApp writes the retrieved entries in a position thesaurus file, which is a text file that is accessible to the ActiveRelationship DM (step 1504). When the ActiveRelationship DM processes the articles of the current batch, it can use the information in the position thesaurus file to disambiguate character strings that refer to a same person.

FIG. 16 shows a method for creating a name-position association file, which is done per batch of articles. For each company in a current batch, ARMApp queries ARMDB and retrieves all entries from the Person table that are associated with the company (step 1602). The information retrieved for each entry includes the identification, the canonical name, the position, and the synonyms for the position (if the entry includes synonyms). ARMApp associates the identification and canonical name with each of the position and position synonyms retrieved and writes the retrieved information and association in a name-position association file, which is a text file that is accessible to the ActiveRelationship DM (step 1404). When the ActiveRelationship DM processes the articles of the current batch, it can use the information in the name-position association file to disambiguate character strings that, although similar or are the same, refer to different individuals.

Once the ARMDB has been built, updates can be performed on an as needed basis or periodically. The information in ARMDB can be accessed and operated on, for example, by using SQL queries, to facilitate relationship management.

Figure 17A:
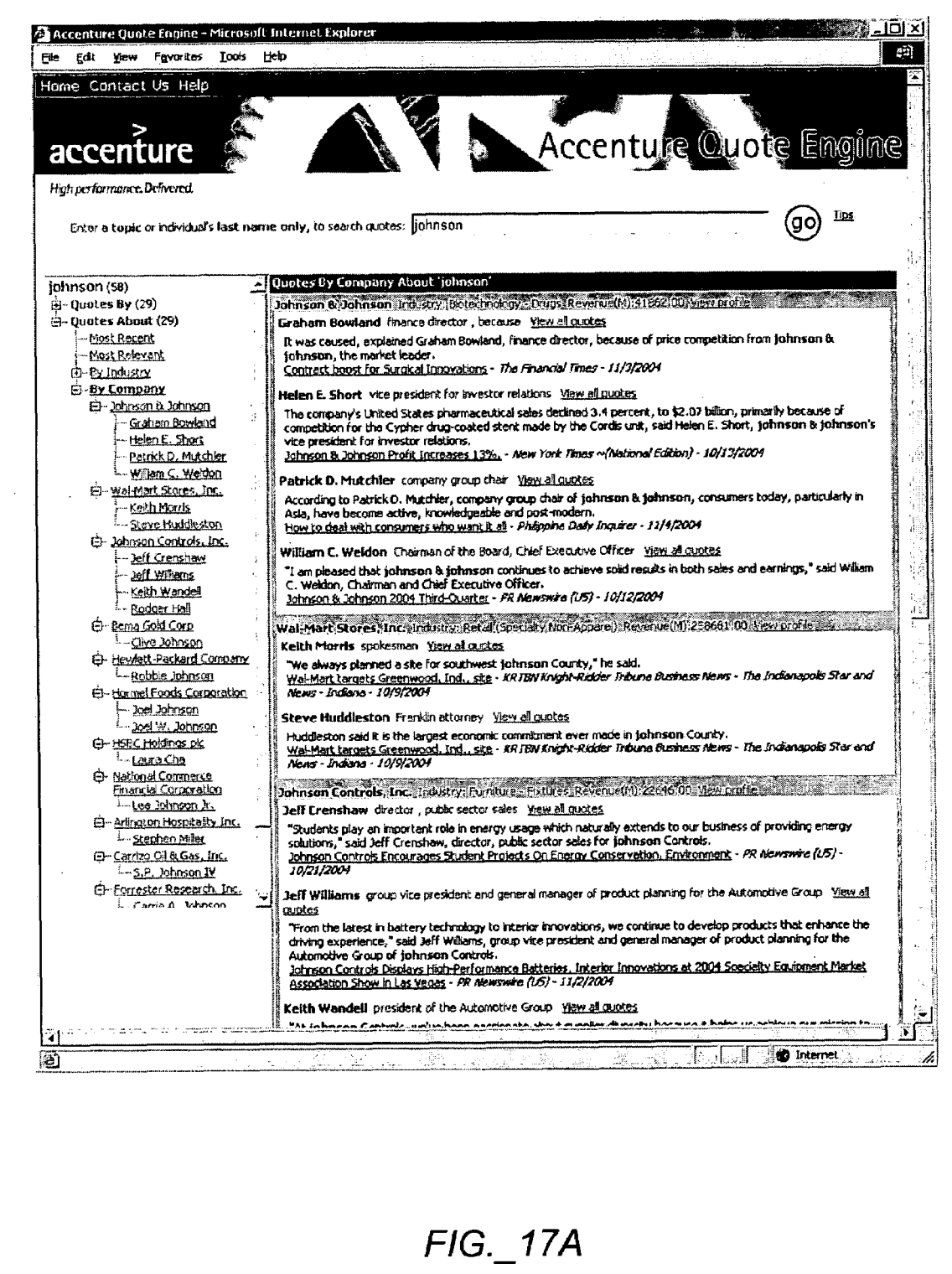

FIGS. 17A-17I show examples of an interface that can be used to search the ARMDB. As shown, a user can specify a last name or topic and quotes relating to the topic or attributable to individuals having the last name are returned. FIG. 17A shows the interface after it has returned search results for a query specifying the search term "Johnson". The left hand pane 1702 has a results tree, with the node primary node "Quotes About" and the secondary node "By Company" expanded. The results under "By Company" show the individuals to whom a quote that includes the search term is attributed. As can be seen, the people are grouped by company. The right hand pane 1704 shows the quotes that includes the search term sorted by company, which are listed in the same order as they are in the left hand pane 1702.

FIG. 17B shows the interface after the user has clicked on Johnson & Johnson in the results tree. Quotes including the search term made by individuals of Johnson & Johnson are shown in the right hand pane 1704. The quotes shown are a subset of the returned quotes from the previous screen. Note the view profile button 1706.

FIG. 17C shows the interface after the user has clicked on the view profile button 1706. The company's profile page is displayed, along with information regarding the company head quarters, links to the profile pages of the company's competitors, and a listing of company employees. The listed name of an employee to whom quotes have been attributed is a hyperlink.

FIG. 17D shows the interface after the user has clicked on Graham Bowland's name. Mr. Bowland's quote is displayed in the right hand pane 1704.

FIG. 17E shows the interface after the user clicked on "By Industry" in the left hand pane 1702. Results of the search term are sorted by industry in the right hand pane 1704. FIG. 17F shows the interface after the user selects the industry labeled "Biotechnology—Drugs". Only quotes from that industry having the search term are displayed in the right hand pane 1704.

FIG. 17G shows the interface after the user has clicked on "Most Recent" in the left hand pane 1702. Search results are given a relevance score based on, for example, the number of instances the search term occurred and where the search term occurred. Clicking on most recent sorts the results by their relevance score.

Figure 17I:
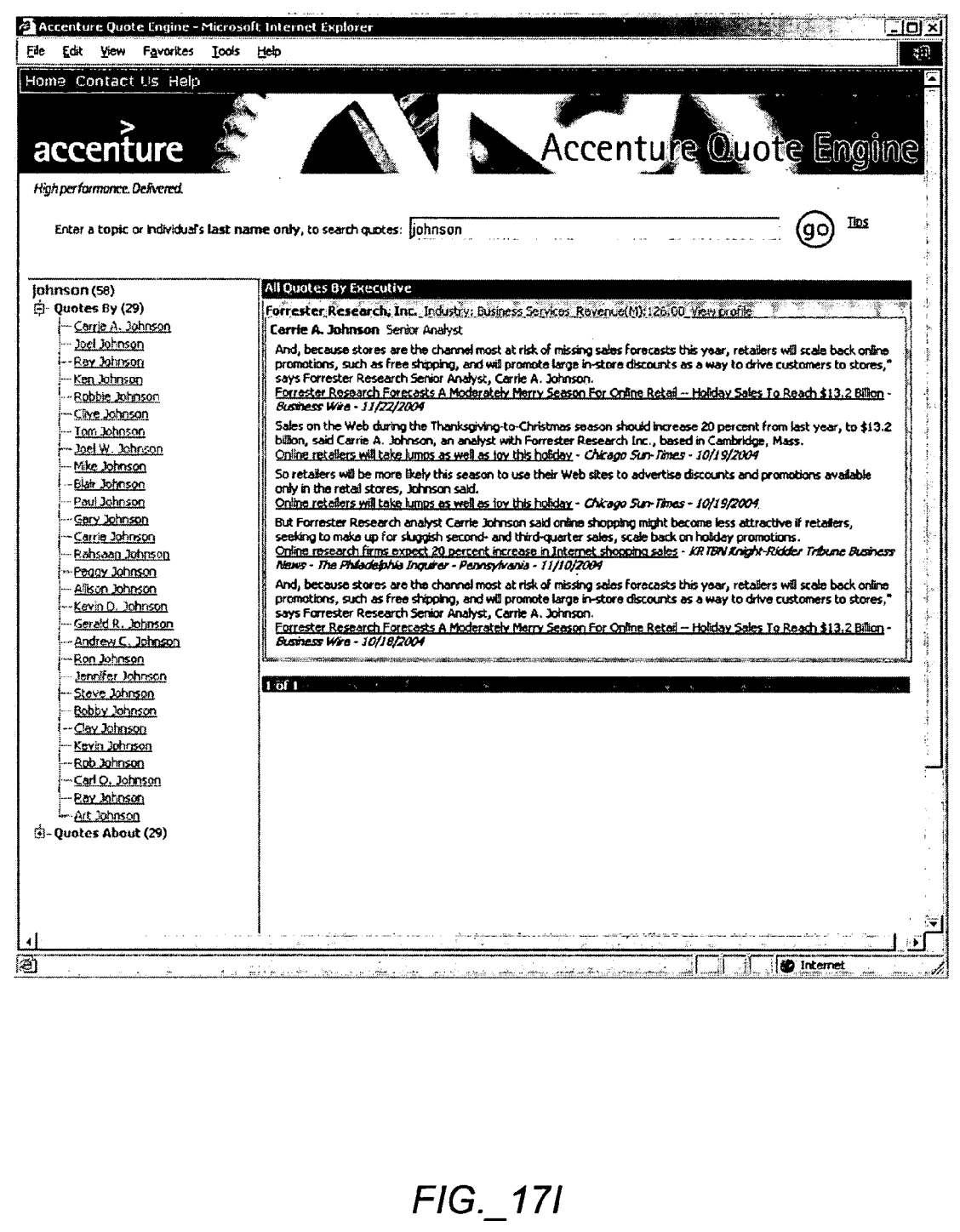

FIG. 17H shows the interface after the user has clicked on "Quotes By", which causes the interface to display in the left hand pane individuals whose names include the search term. FIG. 17I shows the interface after the user has clicked on Carrie A. Johnson. Her quotes are displayed in the right hand pane.

The systems and techniques described here can be implemented in digital electronic circuitry, or in computer hardware, firmware, software, or in combinations of them. The systems and techniques described here can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the method steps described can be performed in a different order and still achieve desirable results. Although information about companies are described above, information about other types of organizations, for example, professional associations, scientific organizations, and research groups, can be implemented. Components of systems described can be combined or separated according to, for example, the function they perform.

What is claimed is:

1. A computer-implemented method comprising:
accessing one or more databases that store published quotes that are attributable to one or more business executives, information identifying the one or more business executives to whom the quotes are attributable, information identifying one or more topics of the quotes, and information identifying one or more companies employing the business executives to whom the quotes are attributable;

receiving a user selection of a name or topic;
selecting the stored quotes that relate to the user-selected name or topic;
grouping the selected quotes according to the business executives to whom the quotes are attributable, the companies employing the business executives to whom the quotes are attributable, and the topics of the quotes;
calculating a frequency in which the business executives and the companies are quoted among the grouped quotes;
comparing the calculated frequency in which the business executives are quoted to a past frequency of quotes attributable to each business executive;
predicting that an authority of a particular business executive has risen or fallen when the calculated frequency associated with the particular business executive is greater or less than the past frequency, respectively; and
providing a user interface including separate regions for displaying subsets of the quotes grouped according to the business executives to whom the quotes are attributable, the companies employing the business executives to whom the quotes are attributable, and the topics of the quotes, and the user interface identifying the particular business executive and indicating that the authority of the particular business executive has risen or fallen.

2. The method of claim 1, further comprising:
assessing that a particular company is receptive to solicitations for business-to-business sales based on the calculated frequency,
wherein the user interface further indicates that the particular company is receptive to solicitations for business-to-business sales.

3. The method of claim 2, further comprising:
determining company positions of each of the business executives,
wherein the frequency in which the business executives are quoted is determined only for those business executives with company positions which exceed a predetermined level.

4. The method of claim 1, further comprising:
determining that quotes attributable to two different business executives from two different companies occur in a single publication; and
grouping the two different business executives as sharing a common concern when determining that the quotes attributable to two different business executives from two different companies occur in a single publication,
wherein the user interface further highlights the two different business executives as sharing a common concern.

5. The method of claim 1, further comprising:
detecting a mouseover mouse event over a portion of the user interface displaying a name of the particular business executive; and
displaying a quantity of stored quotes attributable to the particular business executive and a first of the stored quotes attributable to the particular business executive, based on detecting the mouseover mouse event.

6. The method of claim 1, wherein the user interface further comprises a company profile region for displaying information regarding a company's headquarters, links to a profile page of the company's competitors, and a listing of the company's business executives.

7. The method of claim 1, wherein:
the one or more databases store information identifying one or more industries associated with the companies, the selected quotes are further grouped according to the industries associated with the companies, and the user interface includes a separate region for displaying a subset of the quotes grouped according to the industries associated with the companies.

8. A system comprising:

one or more computers; and a machine-readable storage device coupled to the one or more computers having instructions stored thereon which, when executed by the one or more computers, cause the one or more computers to perform operations comprising:

accessing one or more databases that store published quotes that are attributable to one or more business executives, information identifying the one or more business executives to whom the quotes are attributable, information identifying one or more topics of the quotes, and information identifying one or more companies employing the business executives to whom the quotes are attributable, receiving a user selection of a name or topic, selecting the stored quotes that relate to the user-selected name or topic, grouping the selected quotes according to the business executives to whom the quotes are attributable, the companies employing the business executives to whom the quotes are attributable, and the topics of the quotes, calculating a frequency in which the business executives and the companies are quoted among the grouped quotes, comparing the calculated frequency in which the business executives are quoted to a past frequency of quotes attributable to each business executive, predicting that an authority of a particular business executive has risen or fallen when the calculated frequency associated with the particular business executive is greater or less than the past frequency, respectively, and providing a user interface including separate regions for displaying subsets of the quotes grouped according to the business executives to whom the quotes are attributable, the companies employing the business executives to whom the quotes are attributable, and the topics of the quotes, and the user interface identifying the particular business executive and indicating that the authority of the particular business executive has risen or fallen.

9. The system of claim 8, wherein the operations further comprise:

assessing that a particular company is receptive to solicitations for business-to-business sales based on the calculated frequency, wherein the user interface further indicates that the particular company is receptive to solicitations for business-to-business sales.

10. The system of claim 9, wherein the operations further comprise:

determining company positions of each of the business executives, wherein the frequency in which the business executives are quoted is determined only for those business executives with company positions which exceed a predetermined level.

11. The system of claim 8, wherein the operations further comprise:

determining that quotes attributable to two different business executives from two different companies occur in a single publication; and grouping the two different business executives as sharing a common concern when determining that the quotes attributable to two different business executives from two different companies occur in a single publication, wherein the user interface further highlights the two different business executives as sharing a common concern.

12. The system of claim 8, wherein the operations further comprise:

detecting a mouseover mouse event over a portion of the user interface displaying a name of the particular business executive; and displaying a quantity of stored quotes attributable to the particular business executive and a first of the stored quotes attributable to the particular business executive, based on detecting the mouseover mouse event.

13. The system of claim 8, wherein the user interface further comprises a company profile region for displaying information regarding a company's headquarters, links to a profile page of the company's competitors, and a listing of the company's business executives.

14. The system of claim 8, wherein:

the one or more databases store information identifying one or more industries associated with the companies, the selected quotes are further grouped according to the industries associated with the companies, and the user interface includes a separate region for displaying a subset of the quotes grouped according to the industries associated with the companies.

15. A machine-readable storage device encoded with a computer program, the program comprising instructions that when executed by data processing apparatus cause the data processing apparatus to perform operations comprising:

accessing one or more databases that store published quotes that are attributable to one or more business executives, information identifying the one or more business executives to whom the quotes are attributable, information identifying one or more topics of the quotes, and information identifying one or more companies employing the business executives to whom the quotes are attributable;

receiving a user selection of a name or topic;

selecting the stored quotes that relate to the user-selected name or topic;

grouping the selected quotes according to the business executives to whom the quotes are attributable, the companies employing the business executives to whom the quotes are attributable, and the topics of the quotes;

calculating a frequency in which the business executives and the companies are quoted among the grouped quotes;

comparing the calculated frequency in which the business executives are quoted to a past frequency of quotes attributable to each business executive;

predicting that an authority of a particular business executive has risen or fallen when the calculated frequency associated with the particular business executive is greater or less than the past frequency, respectively; and providing a user interface including separate regions for displaying subsets of the quotes grouped according to the business executives to whom the quotes are attributable, the companies employing the business executives to whom the quotes are attributable, and the topics of the quotes, and the user interface identifying the particular business executive and indicating that the authority of the particular business executive has risen or fallen.

16. The computer storage medium of claim 15, wherein the operations further comprise:
  assessing that a particular company is receptive to solicitations for business-to-business sales based on the calculated frequency,
  wherein the user interface further indicates that the particular company is receptive to solicitations for business-to-business sales.

17. The computer storage medium of claim 16, wherein the operations further comprise:
  determining company positions of each of the business executives,
  wherein the frequency in which the business executives are quoted is determined only for those business executives with company positions which exceed a predetermined level.

18. The computer storage medium of claim 15, wherein the operations further comprise:
  determining that quotes attributable to two different business executives from two different companies occur in a single publication; and
  grouping the two different business executives as sharing a common concern when determining that the quotes attributable to two different business executives from two different companies occur in a single publication,
  wherein the user interface further highlights the two different business executives as sharing a common concern.

19. The computer storage medium of claim 15, wherein the operations further comprise:
  detecting a mouseover mouse event over a portion of the user interface displaying a name of the particular business executive; and
  displaying a quantity of stored quotes attributable to the particular business executive and a first of the stored quotes attributable to the particular business executive, based on detecting the mouseover mouse event.

20. The computer storage medium of claim 15, wherein the user interface further comprises a company profile region for displaying information regarding a company's headquarters, links to a profile page of the company's competitors, and a listing of the company's business executives.

21. The computer storage medium of claim 15, wherein:
  the one or more databases store information identifying one or more industries associated with the companies,
  the selected quotes are further grouped according to the industries associated with the companies, and
  the user interface includes a separate region for displaying a subset of the quotes grouped according to the industries associated with the companies.

* * * * *